United States Patent
Yoneda et al.

(10) Patent No.: US 8,535,431 B2
(45) Date of Patent: Sep. 17, 2013

(54) PORPHYRAZINE COLORING MATTER, INK COMPOSITION CONTAINING THE SAME AND COLORED PRODUCT

(75) Inventors: Takashi Yoneda, Tokyo (JP); Akira Kawaguchi, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 300 days.

(21) Appl. No.: 13/139,402

(22) PCT Filed: Dec. 22, 2009

(86) PCT No.: PCT/JP2009/007094
§ 371 (c)(1),
(2), (4) Date: Jun. 13, 2011

(87) PCT Pub. No.: WO2010/073603
PCT Pub. Date: Jul. 1, 2010

(65) Prior Publication Data
US 2011/0242198 A1  Oct. 6, 2011

(30) Foreign Application Priority Data
Dec. 25, 2008  (JP) ................. 2008-329198

(51) Int. Cl.
C09D 11/02  (2006.01)
C09B 47/00  (2006.01)

(52) U.S. Cl.
USPC ......... 106/31.47; 540/124; 540/125; 540/126

(58) Field of Classification Search
USPC ............ 106/31.47, 31.49; 540/124, 125, 540/126; 347/100; 428/195.1
See application file for complete search history.

(56) References Cited

U.S. PATENT DOCUMENTS

| | | | |
|---|---|---|---|
| 2,276,918 | A | 3/1942 | Bienert et al. |
| 3,622,263 | A | 11/1971 | Groll et al. |
| 4,952,688 | A | 8/1990 | Springer |
| 5,123,960 | A | 6/1992 | Shirota et al. |
| 5,279,622 | A | 1/1994 | Stawitz et al. |
| 5,847,111 | A | 12/1998 | Wald et al. |
| 5,922,116 | A | 7/1999 | Mistry et al. |
| 6,149,722 | A | 11/2000 | Robertson et al. |
| 6,190,422 | B1 | 2/2001 | Carr |
| 6,238,827 | B1 | 5/2001 | Nakazawa et al. |
| 6,379,441 | B1 | 4/2002 | Kanaya et al. |
| 6,569,212 | B2 | 5/2003 | Carr |
| 7,022,171 | B2 | 4/2006 | Patel et al. |
| 7,034,149 | B2 | 4/2006 | Hirokazu et al. |
| 7,087,107 | B2 * | 8/2006 | Tateishi et al. ......... 106/31.49 |

(Continued)

FOREIGN PATENT DOCUMENTS

| | | |
|---|---|---|
| DE | 728931 C | 12/1942 |
| DE | 19521056 A1 | 12/1995 |

(Continued)

OTHER PUBLICATIONS

Notice of Allowance mailed Dec. 17, 2012 in co-pending U.S. Appl. No. 12/999,435.
International Search Report dated Feb. 2, 2010 in corresponding foreign patent application PCT/JP2009/007094.
International Search Report dated May 15, 2007 in co-pending foreign application PCT/JP2007/052212.
International Search Report dated Jul. 10, 2007 in co-pending foreign application PCT/JP2007/057651.
International Search Report dated Apr. 22, 2008 in co-pending foreign application PCT/JP2008/054584.

(Continued)

*Primary Examiner* — Helene Klemanski
(74) *Attorney, Agent, or Firm* — Nields, Lemack & Frame, LLC

(57) ABSTRACT

The present invention relates to a porphyrazine coloring matter or a salt thereof represented by the following formula (1):

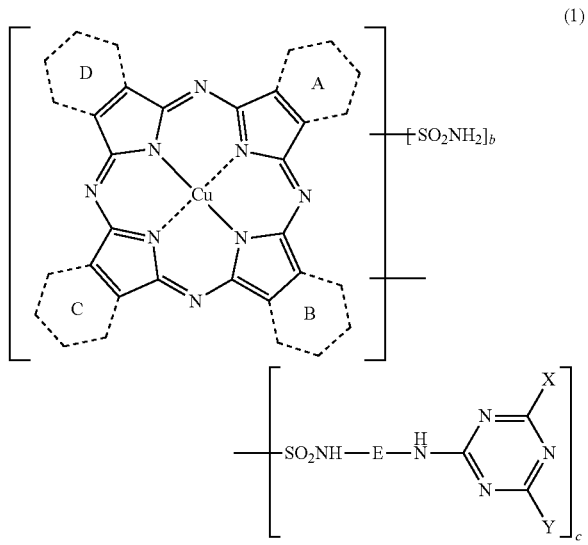

[wherein, the rings A to D are independently a benzene ring or a nitrogen-containing heteroaromatic ring, the number of the nitrogen-containing heteroaromatic ring is more than 0.00 and less than 1.00 as an average value, the rest are benzene rings, E is alkylene, X and Y are a sulfo-substituted anilino group and the like, b is 0.00 or more and less than 3.90 as an average value, c is 0.10 or more and less than 4.00 as an average value, and the sum of b and c is more than 3.00 and less than 4.00 as an average value]. The ink composition containing the porphyrazine coloring matter of the present invention or a salt thereof is an ink composition which has a hue closer to the standard color as a cyan ink, is excellent in various fastnesses, particularly in ozone fastness, and can provide recorded images having a high print density and thus having a good balance, and further it is suitable for inkjet recording.

22 Claims, No Drawings

(56) References Cited

U.S. PATENT DOCUMENTS

| | | |
|---|---|---|
| 7,097,701 B2 | 8/2006 | Tateishi et al. |
| 7,132,012 B2 | 11/2006 | Tateishi et al. |
| 7,160,372 B2 | 1/2007 | Yoshizawa et al. |
| 7,270,701 B2 | 9/2007 | Jinnou et al. |
| 7,282,090 B2 | 10/2007 | Osumi et al. |
| 7,314,273 B2 | 1/2008 | Robertson et al. |
| 7,419,537 B2 | 9/2008 | Fujii et al. |
| 7,566,362 B2 | 7/2009 | Mori et al. |
| 7,585,361 B2 | 9/2009 | Yoneda et al. |
| 7,591,888 B2 | 9/2009 | Fujii et al. |
| 7,611,571 B2 | 11/2009 | Yamashita et al. |
| 7,854,797 B2 | 12/2010 | Fujii et al. |
| 7,981,204 B2 | 7/2011 | Shimizu et al. |
| 8,226,222 B2 | 7/2012 | Kajiura et al. |
| 8,394,186 B2 | 3/2013 | Yoneda et al. |
| 2002/0128249 A1 | 9/2002 | Cook |
| 2004/0045478 A1 | 3/2004 | Tateishi et al. |
| 2005/0126436 A1 | 6/2005 | Patel et al. |
| 2006/0201382 A1 | 9/2006 | Ozawa et al. |
| 2006/0268086 A1 | 11/2006 | Kawakami et al. |
| 2007/0006772 A1 | 1/2007 | Fujii et al. |
| 2008/0274286 A1 | 11/2008 | Yamashita et al. |
| 2009/0029120 A1 | 1/2009 | Fujii et al. |
| 2009/0047430 A1 | 2/2009 | Mori et al. |
| 2009/0151599 A1 | 6/2009 | Fujii et al. |
| 2009/0202798 A1 | 8/2009 | Patel |
| 2010/0112218 A1 | 5/2010 | Fujii et al. |
| 2010/0126377 A1 | 5/2010 | Yoneda et al. |
| 2010/0236448 A1 | 9/2010 | Kurata et al. |
| 2010/0279082 A1 | 11/2010 | Shimizu et al. |
| 2011/0090278 A1 | 4/2011 | Yoneda et al. |
| 2011/0143106 A1* | 6/2011 | Patel .................. 106/31.49 |
| 2011/0234687 A1* | 9/2011 | Patel et al. .................. 106/31.49 |
| 2012/0013678 A1 | 1/2012 | Yoneda et al. |
| 2012/0081457 A1 | 4/2012 | Ooshima et al. |
| 2012/0147084 A1* | 6/2012 | Ikeda et al. .................. 347/20 |
| 2012/0148807 A1* | 6/2012 | Ikeda et al. .................. 428/195.1 |

FOREIGN PATENT DOCUMENTS

| | | |
|---|---|---|
| EP | 0418792 A1 | 3/1991 |
| EP | 0669381 A2 | 8/1995 |
| EP | 0906943 A1 | 4/1999 |
| EP | 0985716 A1 | 3/2000 |
| EP | 1741756 A1 | 1/2007 |
| EP | 2028239 A1 | 2/2009 |
| GB | 2290548 A | 1/1996 |
| JP | 57-198758 A | 12/1982 |
| JP | 59-22967 A | 2/1984 |
| JP | 60-208365 A | 10/1985 |
| JP | 61-2772 A | 1/1986 |
| JP | 62-190273 A | 8/1987 |
| JP | 3-185080 A | 8/1991 |
| JP | 5-171085 A | 7/1993 |
| JP | 7-138511 A | 5/1995 |
| JP | 10-140063 A | 5/1998 |
| JP | 11-515048 A | 12/1999 |
| JP | 2000-303009 A | 10/2000 |
| JP | 2002-80762 A | 3/2002 |
| JP | 2002-105349 A | 4/2002 |
| JP | 2003-34758 A | 2/2003 |
| JP | 2004-75986 A | 3/2004 |
| JP | 2004-323605 A | 11/2004 |
| JP | 2006-45535 A | 2/2006 |
| JP | 2007-23251 A | 2/2007 |
| JP | 2007-277416 A | 10/2007 |
| JP | 2008-13706 A | 1/2008 |
| JP | 2009-057540 A | 3/2009 |
| JP | 2009-062515 A | 3/2009 |
| WO | 02/060994 A | 8/2002 |
| WO | 2004/087815 A1 | 10/2004 |
| WO | 2005/021658 A1 | 3/2005 |
| WO | 2007/091631 A1 | 8/2007 |
| WO | 2007/116933 A1 | 10/2007 |
| WO | 2008/111635 A1 | 9/2008 |
| WO | 2009/084195 A1 | 7/2009 |

OTHER PUBLICATIONS

International Search Report dated Mar. 17, 2009 in co-pending foreign application PCT/JP2008/003947.

International Search Report dated Sep. 15, 2009 in co-pending foreign application PCT/JP2009/002935.

XP-002435570; J. R. Schweizer; May 19, 1964; Farbstoffe; "Cyclo-tetraisoindolenin-(endo-isoindolenino)-Komplex": pp. 510-511.

XP-002435574; DataBase WPI Week 198608; Jan. 8, 1986; Derwent Publications Ltd.; "Ink Composition Blue Colour Low Water Soluble Comprise Sulphonated Copper Phthalo Cyanine Derivative Web Agent"; 1-Page.

XP-002435575; DataBase WPI Week 198548; Oct. 19, 1985; Derwent Publications Ltd.; Copper Phthalocyanine Compound Preparation React Chlorosulphonic Acid Ammonium Hydroxide Triazine Derivative; 1 Page.

XP-002435576; DataBase WPI Week 198303; Dec. 6, 1982; Derwent Publications Ltd.; "Water Soluble Phthalocyanine Dye Low Affinity Cellulose Fast Washing Textile Print" 1-Page.

International Search Report dated May 18, 2010 in co-pending foreign application No. PCT/JP2010/002700.

Notice of Allowance mailed Jun. 19, 2013 in co-pending U.S. Appl. No. 13/258,124.

* cited by examiner

PORPHYRAZINE COLORING MATTER, INK COMPOSITION CONTAINING THE SAME AND COLORED PRODUCT

TECHNICAL FIELD

The present invention relates to a novel porphyrazine coloring matter or a salt thereof, an ink composition containing it, a method for inkjet recording using this ink composition and a colored product.

BACKGROUND ART

Recently, as an image recording material, the materials to form color images are particularly the mainstream, and specifically, inkjet recording materials, thermal transfer image recording materials, recording materials using an electrophotographic system, transfer silver halide photosensitive materials, printing inks, recording pens and the like have been actively utilized. In addition, color filters are used in LCD (liquid crystal display) and PDP (plasma display panel) for displays and in electronic parts such as CCD (charge coupled device) for photographing equipments. In these color image recording materials and color filters, a coloring matter (dye or pigment) of 3 primary colors for the so-called additive and subtractive color mixing processes is used to reproduce or record full color images. However, there is actually no coloring matter which has absorption characteristics providing a desired color reproduction area and can tolerate various use conditions, whereby improvement thereof is strongly required.

The inkjet recording method has been rapidly prevailing and further developing due to its low material cost, possibility of rapid recording, less noise in recording and also easiness of color recording. The inkjet recording method includes the continuous method of continuously discharging ink droplets and the on-demand method of discharging said droplets responding to an image information signal. The discharging method includes a method of discharging ink droplets by applying pressure with piezoelectric elements; a method of discharging ink droplets by generating bubbles in ink by heat; a method by using ultrasonic waves; a method of sucking and discharging ink droplets by electrostatic force; or the like. In addition, examples of the ink suitable for inkjet recording include water-based inks, oil-based inks, solid (melting-type) inks and the like.

The performance required for the coloring matter used in inks suitable for such inkjet recording are good solubility or dispersibility in solvents, ability of high density recording, good hue, good fastness to light, heat and active gases (oxidizing gases such as NOx and ozone, and in addition, SOx and the like) in the environment, excellent durability against water and chemicals, good fixation to record-receiving materials resulting in no bleeding, excellent storage stability as an ink, no toxicity, and also inexpensive availability, and the like. In particular, a cyan coloring matter having a good cyan hue, allowing recorded matters with a high print density and giving excellent fastnesses of recorded image, for example, light fastness (durability to light), ozone fastness (durability to ozone gas) and moisture fastness (durability under high humidity) is strongly desired.

As a water-soluble cyan coloring matter used for inks suitable for inkjet recording, a phthalocyanine-based coloring matter and a triphenylmethane-based coloring matter are typical. The typical phthalocyanine-based coloring matter reported and used in the widest range includes phthalocyanine derivatives classified into the following A to H:

A: Known phthalocyanine-based coloring matter having C.I. (color index) numbers such as Direct Blue 86, Direct Blue 87, Direct Blue 199, Acid Blue 249, Reactive Blue 71 or the like;

B: Phthalocyanine-based coloring matter described in Patent Literatures 1 to 3 and the like,
[for example, a mixture of $Cu\text{-}Pc\text{-}(SO_3Na)m(SO_2NH_2)n$; $m+n=1$ to 4] (Pc represents phthalocyanine residue, as is the same hereinafter);

C: Phthalocyanine-based coloring matter described in Patent Literature 4 and the like,
[for example, $Cu\text{-}Pc\text{-}(CO_2H)m(CONR^1R^2)n$; $m+n=$ a number of 0 to 4];

D: Phthalocyanine-based coloring matter described in Patent Literature 5 and the like,
[for example, $Cu\text{-}Pc\text{-}(SO_3H)m(SO_2NR^1R^2)n$; $m+n=$ a number of 0 to 4, and $m\neq 0$];

E: Phthalocyanine-based coloring matter described in Patent Literature 6 and the like,
[for example, $Cu\text{-}Pc\text{-}(SO_3H)l(SO_2NH_2)m(SO_2NR^1R^2)n$; $l+m+n=$ a number of 0 to 4];

F: Phthalocyanine-based coloring matter described in Patent Literature 7 and the like,
[for example, $Cu\text{-}Pc\text{-}(SO_2NR^1R^2)n$; $n=$ a number of 1 to 5];

G: Phthalocyanine-based coloring matter described in Patent Literatures 8, 9 and 12 and the like,
[phthalocyanine compound in which the substitution position of the substituent is controlled, phthalocyanine-based coloring matter in which a substituent is introduced at the beta-position];

H: Benzo pyridoporphyrazine-based coloring matter having a pyridine ring and a benzene ring, described in Patent Literatures 10, 13 to 21 and the like;

I: Phthalocyanine-based coloring matter described in Patent Literature 11 and the like,
[for example, $Cu\text{-}Pc\text{-}(SO_3H)a(SO_2NR_1R_2)b(SO_2NH\text{—}X\text{—}NH\text{-}(4\text{-}Y\text{-}6\text{-}Z\text{-}1,3,5\text{-triazin-2-yl}))c$; $a+b+c=$ a number of 2 to 4].

The phthalocyanine-based coloring matter typified by Direct Blue 86 or Direct Blue 199 which are usually used widely at present has a characteristic of being excellent in light fastness compared with magenta coloring matters and yellow coloring matters which are generally known. The phthalocyanine-based coloring matter has a greenish hue under acidic conditions, whereby it is not very preferable as a cyan ink. Therefore, it is preferable that these coloring matters are used under neutral to alkaline conditions when used as a cyan ink. However, although the ink to be used is neutral to alkaline, it is possible that the hue of a printed matter is greatly changed when the record-receiving material to be used is an acidic paper.

In addition, when the phthalocyanine-based coloring matter is used as a cyan ink, the hue of a printed matter is discolored greenish and also color fading occurs due to oxidizing gases such as nitrogen oxide gas and ozone which are often concerned nowadays as an environmental problem, whereby the print density is concurrently reduced.

On the other hand, the triphenylmethane-based coloring matter has a good hue but is very inferior in light fastness, ozone fastness and moisture fastness.

From here on, as the application field of inkjet recording is widespread and inkjet recording is widely used in articles on exhibition for advertisement and the like, the ink used there will be more and more strongly required to have a good hue and to be inexpensive, and further, there will be more opportunities for coloring matter and ink to be exposed to light and oxidizing gases in the environment, whereby it is strongly required in particular to have a good hue and to be excellent in light fastness, oxidizing gas fastness, and moisture fastness. The term "oxidizing gas" referred here means gas existing in the air and having oxidizing effect. The term "oxidizing gas fastness" means durability to the phenomenon that coloring matter (dye) of recorded image on or in recorded paper is reacted with oxidizing gas, resulting in discoloration or fading of recorded image. Among oxidizing gases, ozone gas is particularly regarded to be the main causative matter promoting the discoloration or fading phenomenon of inkjet recorded images. This discoloration or fading phenomenon is characteristic of inkjet recorded images, whereby improvement of ozone gas fastness is an important technical challenge in this field. However, It is considered difficult to develop a cyan coloring matter (for example, phthalocyanine-based coloring matter) and a cyan ink satisfying these requirements at a high level. In the past, phthalocyanine-based coloring matters or benzo pyridoporphyrazine coloring matters to which fastness to ozone gases is imparted are disclosed in Patent Literatures 3, 8 to 12 and 14 to 17, and some are considerably excellent in all qualities of hue, print density, light fastness, ozone gas fastness, moisture fastness, no-bronzing phenomenon and the like, but there are some with an optimistic evaluation of hue and the like, whereby the requirements of the market have not been sufficiently satisfied.

[Patent Literature 1] Japanese Patent Laid-Open No. 62-190273 A
[Patent Literature 2] Japanese Patent Laid-Open No. 7-138511 A
[Patent Literature 3] Japanese Patent Laid-Open No. 2002-105349 A
[Patent Literature 4] Japanese Patent Laid-Open No. 5-171085 A
[Patent Literature 5] Japanese Patent Laid-Open No. 10-140063 A
[Patent Literature 6] National Publication of International Patent Application No. 11-515048 A
[Patent Literature 7] Japanese Patent Laid-Open No. 59-22967 A
[Patent Literature 8] Japanese Patent Laid-Open No. 2000-303009 A
[Patent Literature 9] Japanese Patent Laid-Open No. 2002-249677 A
[Patent Literature 10] Japanese Patent Laid-Open No. 2003-34758 A
[Patent Literature 11] Japanese Patent Laid-Open No. 2002-80762 A
[Patent Literature 12] WO 2004/087815
[Patent Literature 13] WO 2002/034844
[Patent Literature 14] Japanese Patent Laid-Open No. 2004-75986 A
[Patent Literature 15] WO 2007/091631
[Patent Literature 16] WO 2007/116933
[Patent Literature 17] WO 2008/111635
[Patent Literature 18] WO 2002/088256
[Patent Literature 19] WO 2005/021658
[Patent Literature 20] Japanese Patent Laid-Open No. 2005-179469 A
[Patent Literature 21] Japanese Patent Laid-Open No. 2005-220253 A

DISCLOSURE OF THE INVENTION

Problems to be Solved by the Invention

It is an object of the present invention to provide a porphyrazine coloring matter or a salt thereof which has a good hue as a cyan ink, hardly causes bronzing phenomenon, has a good balance with an excellent ozone fastness and is suitable for inkjet recording, and an ink composition containing this.

Means of Solving the Problems

The present inventors have intensively studied and found that a certain porphyrazine coloring matter represented by the following formula (1) can solve the above-described problems, and the present invention has been completed. That is, the present invention relates to:

(1)
A porphyrazine coloring matter represented by the following formula (1) or a salt thereof:

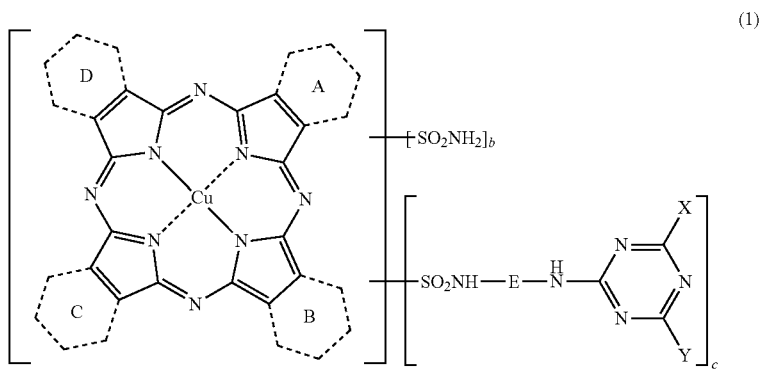

[wherein,
the rings A to D each independently represent a benzene ring or a 6-membered nitrogen-containing heteroaromatic ring fused to a porphyrazine ring, the number of the nitrogen-containing heteroaromatic ring is more than 0.00 and less than 1.00 as an average value, and the rest are benzene rings;
E represents alkylene;
X and Y are each independently an anilino or naphthylamino group having a sulfo group, a carboxy group or a phosphono group as a substituent;
in addition, said anilino or naphthylamino group may be substituted by 1 kind or 2 or more kinds of groups selected from the group consisting of a sulfo group, a carboxy group, a phosphono group, a sulfamoyl group, a carbamoyl group, a hydroxy group, an alkoxy group, an amino group, a mono- or dialkylamino group, a mono- or diarylamino group, an acetylamino group, an ureide group, an alkyl group, a nitro group, a cyano group, a halogen atom, an alkylsulfonyl group, an alkylthio group, an aryloxy group and a heterocyclic group;

b is 0.00 or more and less than 3.90 as an average value;
c is 0.10 or more and less than 4.00 as an average value;
and the sum of b and c is more than 3.00 and less than 4.00 as an average value, provided that the number of the nitrogen-containing heteroaromatic ring is more than 0.0 and less than 0.5 as an average value when X and Y are each independently an anilino group having 1 to 3 carboxy groups as a substituent, and b is 0 or more and up to 3.4 as an average value;
c is 0.1 or more and up to 3.5 as an average value;
and the sum of b and c is from 1.0 to 3.5.], (2)
The porphyrazine coloring matter or a salt thereof according to the above (1), wherein the 6-membered nitrogen-containing heteroaromatic rings represented by the rings A to D are pyridine rings or pyrazine rings, (3)
The porphyrazine coloring matter or a salt thereof according to the above (1) or (2), which is obtained by reacting a porphyrazine compound represented by the following formula (3) with an organic amine represented by the following formula (4) in the presence of ammonia:

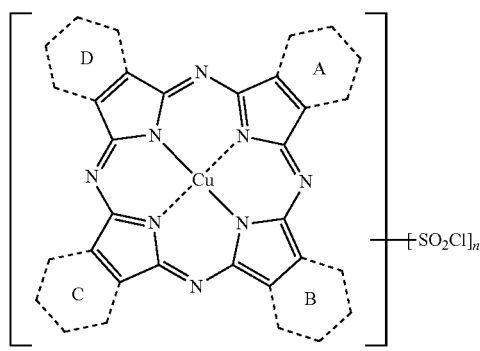

(3)

[wherein, the rings A to D have the same meaning as described in the above (1), and n is more than 3.00 and less than 4.00],

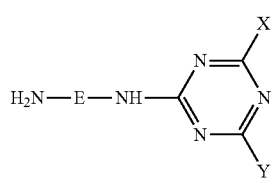

(4)

[wherein, E, X and Y have the same meaning as described in the above (1)], (4)
The porphyrazine coloring matter or a salt thereof according to any one of the above (1) to (3), wherein
the 6-membered nitrogen-containing heteroaromatic ring for the rings A to D is a pyridine ring, and the ring-fusion position of said pyridine ring is the 2- and 3-positions, the 3- and 4-positions, the 4- and 5-positions or the 5- and 6-positions when the nitrogen atom of the pyridine ring is at the 1-position; or the 6-membered nitrogen-containing heteroaromatic ring for the rings A to D is a pyrazine ring, and the ring-fusion position of said pyrazine ring is the 2- and 3-positions when the nitrogen atom of the pyrazine ring is at the 1- and 4-positions;

E is C2-C4 alkylene;
X and Y are each independently an anilino or naphthylamino group having a sulfo group, a carboxy group or a phosphono group as a substituent;
said anilino or naphthylamino group may further have 0 to 3 substituents of 1 kind or 2 or more kinds selected from the group consisting of a hydroxy group, an alkoxy group, an ureide group, an acetylamino group, a nitro group and a chlorine atom, (5)
The porphyrazine coloring matter or a salt thereof according to any one of the above (1) to (4), wherein
the number of the 6-membered nitrogen-containing heteroaromatic rings for the rings A to D is 0.2 to 0.9 as an average value and the rest are benzene rings;
b is 0.0 to 3.7 as an average value;
c is 0.1 to 3.8 as an average value;
and the sum of b and c is 3.1 to 3.8 as an average value, (6)
The porphyrazine coloring matter or a salt thereof according to any one of the above (1) to (5), wherein
the number of the 6-membered nitrogen-containing heteroaromatic rings for the rings A to D is 0.25 to 0.85 as an average value, and the rest are benzene rings;
E represents C2-C4 alkylene;
X and Y are each independently an anilino group substituted by a sulfo group or a carboxy group;
b is 0.00 to 3.05 as an average value;
c is 0.10 to 3.75 as an average value;
and the sum of b and c is 3.15 to 3.75 as an average value, (7)
The porphyrazine coloring matter or a salt thereof according to any one of the above (1) to (6), wherein
X and Y are each independently an anilino group substituted by a sulfo group, (8)
The porphyrazine coloring matter or a salt thereof according to any one of the above (1) to (6), wherein
the 6-membered nitrogen-containing heteroaromatic ring for the rings A to D is a pyridine ring, and the ring-fusion position of said pyridine ring is the 2- and 3-positions when the nitrogen atom of the pyridine ring is the 1-position, and the number of said pyridine ring is 0.50 to 0.85 as an average value, and the rest are benzene rings;
E is ethylene or propylene;
X and Y are each independently an anilino group having a sulfo group as a substituent;
b is 0.00 to 3.40 as an average value;
c is 0.10 to 3.50 as an average value;
and the sum of b and c is 3.15 to 3.50 as an average value, (9)
An ink composition containing a porphyrazine coloring matter or a salt thereof according to any one of the above (1) to (8) as a coloring matter and further containing water,

(10)
The ink composition according to the above (9), which further contains an organic solvent,

(11)
The ink composition according to the above (9) or (10), which is for inkjet recording,

(12)
A method for inkjet recording, wherein recording is carried out by discharging an ink droplet of an ink composition containing the porphyrazine coloring matter or a salt thereof according to any one of the above (1) to (8) and water, in response to a recording signal to adhere on a record-receiving material,

(13)
The method for inkjet recording according to the above (12), wherein the record-receiving material is a communication sheet,

(14)
The method for inkjet recording according to the above (13), wherein the communication sheet is a sheet subjected to surface treatment and having an ink-receiving layer containing white inorganic pigment particles on the support,

(15)
A container containing an ink composition containing the porphyrazine coloring matter or a salt thereof according to any one of the above (1) to (8) and water,

(16)
An inkjet printer comprising the container according to the above (15),

(17)
A colored product colored with an ink composition containing the porphyrazine coloring matter or a salt thereof according to any one of the above (1) to (8) and water,

(18)
The porphyrazine coloring matter or a salt thereof according to any one of the above (1) to (8), wherein X and Y are each independently a 3-sulfoanilino group or a 4-sulfoanilino group.

Effect of the Invention

The ink composition using the coloring matter of the present invention has a good hue as a cyan ink. In addition, recorded images obtained by the ink composition of the present invention cause no bronzing phenomenon, have good ozone fastness, and have an excellent balance of hue, resistance to bronzing phenomenon and ozone fastness. Further, it has no solid precipitation, no change in physical properties, no color change or the like after storage for a long period of time, and thus has a good storage stability.

Therefore, the cyan ink containing the porphyrazine coloring matter of the present invention or a salt thereof is extremely useful as an ink for inkjet recording.

BEST MODE FOR CARRYING OUT THE INVENTION

The present invention will be more specifically explained.

The porphyrazine coloring matter or a salt thereof represented by the above formula (1) of the present invention is a porphyrazine coloring matter or a salt thereof where an unsubstituted sulfamoyl group and a certain substituted sulfamoyl group are introduced into a compound in which more than 0 and less than 1 of the 4 benzo (benzene) rings in tetrabenzoporphyrazine (usually referred to as phthalocyanine) are replaced by a nitrogen-containing heteroaromatic ring, and it is substantially a mixture. In this regard, in the present description, "porphyrazine coloring matter of the present invention or a salt thereof" is hereinafter described as "the porphyrazine coloring matter of the present invention" for convenience, unless otherwise specifically noted.

In the above formula (1), the nitrogen-containing heteroaromatic ring in the rings A to D (4 rings of the rings A, B, C and D) represented by broken line includes, for example, nitrogen-containing heteroaromatic rings containing 1 to 2 nitrogen atoms, such as a pyridine ring, a pyrazine ring, a pyrimidine ring and a pyridazine ring. Among them, a pyridine ring or a pyrazine ring is preferable and a pyridine ring is more preferable.

The number of the nitrogen-containing heteroaromatic ring is, as an average value in the present application, in the range of usually more than 0.00 and less than 1.00, preferably 0.1 or more and 0.95 or less, more preferably 0.2 or more and 0.9 or less, further preferably 0.2 or more and 0.85 or less, particularly preferably 0.25 or more and 0.85 or less, and most preferably 0.5 or more and 0.85 or less. The rest rings A to D are benzene rings, and the benzene ring for the rings A to D is, as an average value, usually more than 3.00 and less than 4.00, preferably 3.05 or more and 3.9 or less, more preferably 3.1 or more and 3.8 or less and in some cases, 3.15 or more and 3.8 or less, further preferably 3.15 or more and 3.75 or less, and particularly preferably 3.15 or more and 3.5 or less. In this regard, however, the number of the nitrogen-containing heteroaromatic ring is over 0.0 and less than 0.5 as an average value when X and Y are each independently an anilino group having 1 to 3 carboxy groups as a substituent, b is 0 or more and up to 3.4 as an average value, c is 0.1 or more and up to 3.5 as an average value, and the sum of b and c is from 1.0 to 3.5.

The position where the nitrogen-containing heteroaromatic ring is fused to the porphyrazine ring is not particularly limited as long as it is a position having two consecutive carbon atoms in said heteroaromatic ring. It is preferably: the 2- and 3-positions or the 5- and 6-positions, otherwise the 3- and 4-positions or the 4- and 5-positions when the nitrogen-containing heteroaromatic ring is a pyridine ring, and preferably the former; the 2- and 3-positions in case of a pyrazine ring; the 4- and 5-positions in case of a pyrimidine ring; and the 3- and 4-positions or the 4- and 5-positions in case of a pyridazine ring.

The porphyrazine coloring matter of the present invention is a mixture of plural coloring matters, as is clear from representing the number of the nitrogen-containing heterocyclic ring for the rings A to D by the average values. More specifically, the porphyrazine coloring matter of the present invention is a mixture of a porphyrazine coloring matter where all of the rings A to D are benzene rings and a porphyrazine coloring matter where 1 or 2 or more of the rings A to D are 6-membered nitrogen-containing heteroaromatic rings. It is difficult to isolate these components and practically it is no problem to use the mixture as it is, whereby "the number of the benzene ring or the 6-membered nitrogen-containing heteroaromatic ring" in the present application represents the average value of the number of the benzene ring or the 6-membered nitrogen-containing heteroaromatic ring, per molecule in said mixture.

In this regard, in the present description, unless otherwise specifically noted, the number of said nitrogen-containing heteroaromatic ring and the number of the substituent represented by b or c are shown to the first or second decimal place by rounding the number in the second or third decimal place, according to necessity.

In the above formula (1), alkylene for E includes, for example, C2-C12 straight-chain, branched-chain or cyclic alkylene, straight-chain or cyclic is preferable, and straight-chain is more preferable. The carbon atom number includes preferably C2-C6, more preferably C2-C4 and further preferably C2-C3 alkylene.

Specific examples of alkylene for E include straight-chain ones such as ethylene, propylene, butylene, pentylene, hexylene, heptylene, octylene, nonylene, decylene, undecylene and dodecylene; branched-chain ones such as 2-methylethylene; cyclic ones typified by cyclopropylenediyl, 1,2- or 1,3-cyclopentylenediyl, 1,2-, 1,3- or 1,4-cyclohexylenediyl; and the like. Preferable specific examples of alkylene for E are ethylene, propylene or butylene, more preferably ethylene or propylene and further preferably ethylene.

In the above formula (1), X and Y each independently represent an anilino or naphthylamino group having a sulfo group, a carboxy group or a phosphono group as a substituent. Said anilino group or said naphthylamino group has any one group selected from the group consisting of a sulfo group, a carboxy group and a phosphono group, as a substituent.

Said anilino group or said naphthylamino group is preferably an anilino or naphthylamino group substituted with a sulfo group or a carboxy group. More preferable is an anilino or naphthylamino group substituted by a sulfo group; and further preferable is an anilino group substituted by a sulfo group.

The substitution position of the sulfo group, the carboxy group or the phosphono group is not particularly limited but: in the case of one anilino group, it is preferably substituted at the 2-position, the 3-position or the 4-position, preferably the 3-position or the 4-position and more preferably the 4-position; in the case of a naphthylamino group, it is preferably substituted at any of the 3-position, the 5-position, the 6-position, the 7-position and the 8-position, when the substitution position of the amino group is the 1-position or the 2-position.

In addition, the substitution position of the amino group for said naphthylamino group is preferably the 1-position or the 2-position.

When said anilino group has one substituent, specific examples thereof include those substituted by a sulfo group, such as 2-sulfoanilino, 3-sulfoanilino and 4-sulfoanilino; those substituted by carboxy, such as 2-carboxyanilino, 3-carboxyanilino and 4-carboxyanilino; and those substituted by a phosphono group, such as 2-phosphoanilino, 3-phosphoanilino and 4-phosphoanilino.

When said naphthylamino group has one substituent, specific examples thereof include those substituted by a sulfo group, such as 6-sulfo-1-naphthylamino and 6-sulfo-2-naphthylamino; those substituted by a carboxy group, such as 6-carboxy-1-naphthylamino and 6-carboxy-2-naphthylamino; and those substituted by a phosphono group, such as 6-phospho-1-naphthylamino and 6-phospho-2-naphthylamino.

The anilino or naphthylamino group for the above X and Y, having a sulfo group, a carboxy group or a phosphono group as a substituent, may be further substituted by 1 kind or 2 or more kinds, preferably 1 kind to 3 kinds, more preferably 1 kind or 2 kinds and further preferably 1 kind of substituents selected from the group consisting of 22 substituents, (1) a sulfo group, (2) a carboxy group, (3) a phosphono group, (4) a sulfamoyl group, (5) a carbamoyl group, (6) a hydroxy group, (7) an alkoxy group, (8) an amino group, (9) a monoalkylamino group, (10) a dialkylamino group, (11) a monoarylamino group, (12) a diarylamino group, (13) an acetylamino group, (14) an ureide group, (15) an alkyl group, (16) a nitro group, (17) a cyano group, (18) a halogen atom, (19) an alkylsulfonyl group, (20) an alkylthio group, (21) an aryloxy group and (22) a heterocyclic group.

The number of the substitution by a group selected from the group consisting of these 22 kinds of substituents is: usually 0 to 3, preferably 0 to 2, more preferably 0 or 1 and further preferably 0 when X and Y are the above anilino groups; usually 0 to 3 and preferably 0 to 2 when X and Y are the above naphthylamino groups.

The alkoxy group in the groups selected from the group consisting of the 22 kinds of substituents includes straight-chain, branched-chain or cyclic C1-C6, preferably C1-C4 and more preferably C1-C3 alkoxy groups. Straight-chain or branched-chain alkoxy is preferable and straight-chain alkoxy is more preferable.

Specific examples thereof include straight-chain alkoxy such as methoxy, ethoxy, n-propoxy, n-butoxy, n-pentoxy and n-hexyloxy; branched-chain alkoxy such as isopropoxy, isobutoxy, t-butoxy, isopentoxy and isohexyloxy; cyclic alkoxy such as cyclopropoxy, cyclopentoxy and cyclohexyloxy; and the like.

The monoalkylamino group in the groups selected from the group consisting of the 22 kinds of substituents include straight-chain or branched-chain mono C1-C4 and preferably mono C1-C3 alkyl amino groups. Specific examples thereof include straight-chain alkylamino such as methylamino, ethylamino, n-propylamino and n-butylamino; branched-chain alkylamino such as isopropylamino, isobutylamino and t-butylamino; and the like.

The dialkylamino group in the groups selected from the group consisting of the 22 kinds of substituents includes a dialkylamino group independently having two straight-chain or branched-chain C1-C4 and preferably C1-C3 alkyls, the alkyls being listed in the above monoalkylamino group. Specific examples thereof include dimethylamino, diethylamino, methylethylamino and the like.

The monoarylamino group in the groups selected from the group consisting of the 22 kinds of substituents includes mono C6-C10 aromatic amino groups, preferably a phenylamino group or a naphthylamino group and more preferably a phenylamino group.

The diarylamino group in the groups selected from the group consisting of the 22 kinds of substituents includes a diarylamino group independently having two C6-C10 aromatics, preferably phenyls or naphthyls and more preferably phenyls, the aryls being listed in the above monoarylamino group. It includes an amino group having preferably two same aryls and more preferably phenyls. Specific examples thereof include diphenylamino.

The alkyl group in the groups selected from the group consisting of the 22 kinds of substituents includes straight-chain, branched-chain or cyclic C1-C6, preferably C1-C4 and more preferably C1-C3 alkyl groups. Straight-chain or branched-chain alkyl groups are preferable and straight-chain alkyl groups are more preferable. Specific examples thereof include straight-chain alkyl such as methyl, ethyl, n-propyl, n-butyl, n-pentyl and n-hexyl; branched-chain alkyl such as isopropyl, isobutyl, isopentyl and isohexyl; cyclic alkyl such as cyclopropyl, cyclopentyl and cyclohexyl; and the like.

The halogen atom in the groups selected from the group consisting of the 22 kinds of substituents includes a fluorine atom, a chlorine atom and a bromine atom, a fluorine atom or a chlorine atom is preferable, and a chlorine atom is more preferable.

The alkylsulfonyl group in the groups selected from the group consisting of the 22 kinds of substituents includes a sulfonyl group substituted by a straight-chain or branched-chain C1-C6, preferably C1-C4 and more preferably C1-C3 alkyl. Said alkyl is preferably straight-chain alkyl. Specific examples thereof include straight-chain alkylsulfonyl such as methanesulfonyl, ethane sulfonyl and propane sulfonyl; branched-chain alkylsulfonyl such as isopropylsulfonyl; and the like.

The alkylthio group in the groups selected from the group consisting of the 22 kinds of substituents includes straight-chain or branched-chain C1-C6, preferably C1-C4 and more preferably C1-C3 alkylthio groups. Said alkyl is preferably straight-chain alkyl. Specific examples thereof include straight-chain alkylthio such as methylthio, ethylthio, propylthio and butylthio; branched-chain alkylthio such as isopropylthio; and the like.

The aryloxy group in the groups selected from the group consisting of the 22 kinds of substituents includes C6-C10 monocyclic or ring-fused structural aryloxy groups, more preferable is phenoxy or naphthyloxy, and further preferable is phenoxy. Said aryloxy group may have a halogen atom, preferably a chlorine atom, a C1-C4 alkoxy group, a nitro group or a sulfo group as a substituent or may be unsubstituted. Specific examples of said aryloxy group include unsubstituted aryloxy groups such as phenoxy, 1-naphthyloxy and 2-naphthyloxy; a halogen atom- and preferably chlorine atom-substituted aryloxy groups such as 2,4-dichloro phenoxy and 4-chloro phenoxy; C1-C4 alkoxy-substituted aryloxy groups such as 4-methoxyphenoxy; nitro-substituted aryloxy groups such as 2-nitrophenoxy and 4-nitrophenoxy; sulfo-substituted aryloxy groups such as 2-sulfo-6-naphthyloxy; and the like.

The heterocyclic group in the groups selected from the group consisting of the 22 kinds of substituents includes 5 to 6-membered rings containing a hetero atom, and among them, and is preferably a heteroaromatic ring group containing a nitrogen atom, an oxygen atom or/and a sulfur atom. Specifically, it includes unsubstituted or carboxy-substituted nitrogen-containing heteroaromatic ring groups such as pyridin-3-yl, pyridin-4-yl and 6-carboxypyridin-3-yl, and preferably unsubstituted or carboxy-substituted pyridine ring groups; sulfur-containing heteroaromatic ring groups such as thiophen-2-yl and 5-chloro thiophen-2-yl, and preferably unsubstituted or chlorine atom-substituted thiophene groups; oxygen-containing heteroaromatic ring groups such as furan-2-yl, and preferably unsubstituted furan ring groups.

Specific examples of the case where the above anilino group or the above naphthyl group for the above X and Y has 1 or 2 groups selected from the group consisting of the 22 kinds of substituents include those further substituted by a sulfo group, a carboxy group, an alkoxy group, a monoarylamino group, an acetylamino group, an alkyl group or a halogen atom on the anilino group substituted by a sulfo group, such as 2,5-disulfoanilino, 2,4-disulfoanilino, 2-carboxy-4-sulfoanilino, 2-carboxy-5-sulfoanilino, 4-ethoxy-2-sulfoanilino, 4-anilino-3-sulfoanilino, 4-acetylamino-2-sulfoanilino, 2-methyl-5-sulfoanilino and 2-chloro-5-sulfoanilino; those further substituted by 2 kinds of groups or by 2 groups on the anilino group substituted by a sulfo group, such as 2-methoxy-4-nitro-5-sulfoanilino, 3-carboxy-4-hydroxy-5-sulfoanilino, 2-hydroxy-5-nitro-3-sulfoanilino and 3,5-dichloro-4-sulfoanilino; those further substituted by a hydroxy group or a carboxy group on the anilino group substituted by a carboxy group, such as 3-carboxy-4-hydroxyanilino and 3,5-dicarboxyanilino; those further substituted by a sulfo group or a hydroxy group on the naphthylamino group substituted by sulfo group, such as 5,7-disulfonaphthalen-2-ylamino, 6,8-disulfonaphthalen-2-ylamino, 3,6-disulfonaphthalen-1-ylamino, 3,8-disulfonaphthalen-1-ylamino, 4,8-disulfonaphthalen-2-ylamino, 8-hydroxy-6-sulfonaphthalen-2-ylamino and 5-hydroxy-7-sulfonaphthalen-2-ylamino; those further substituted by 2 groups or 2 kinds of groups on the naphthylamino group substituted by a sulfo group, such as 3,6,8-trisulfonaphthalen-1-ylamino, 3,6,8-trisulfonaphthalen-2-ylamino, 4,6,8-trisulfonaphthalen-2-ylamino and 8-hydroxy-3,6-disulfonaphthalen-1-ylamino, 8-chloro-3,6-disulfonaphthalen-1-ylamino; and the like.

The group selected from the group consisting of the 22 kinds of substituents is preferably a sulfo group, a carboxy group, an alkoxy group, a monoarylamino group, an acetylamino group, an alkyl group or a halogen atom (preferably, a chlorine atom) and more preferably a sulfo group or a carboxy group. In some cases, it is preferably a sulfo group, a carboxy group, a phosphono group, a hydroxy group and an alkoxy group, more preferably a C1-C6 alkoxy group, an ureide group, an acetylamino group, a nitro group or a chlorine atom, and more preferably a sulfo group or a hydroxy group. The group selected from the group consisting of the 22 kinds of substituents is further preferably a sulfo group.

The anilino or naphthylamino group for the above X and Y, having a sulfo group, a carboxy group or a phosphono group as a substituent, may be further substituted by 1 kind or 2 or more kinds of group selected from the group consisting of the above 22 kinds of substituents, in some cases. However, it is usually preferred that said anilino group and said naphthylamino group do not have a group selected from the group consisting of said 22 kinds of substituents. Specifically, the above X and Y are preferably anilino or naphthylamino groups having a sulfo group, a carboxy group or a phosphono group as a substituent and having no other substituents. They are more preferably sulfoanilino groups having one sulfo group as a substituent and having no other substituents.

In the present description, all of the numerical values described as b, c and the sum of b and c in the above formula (1) are average values in the above porphyrazine coloring matter of the present invention. As is the case in the number of the nitrogen-containing heteroaromatic ring or the benzene ring for the rings A to D, the porphyrazine coloring matter represented by the above formula (1) of the present invention is a mixture of plural coloring matters having different values of b and c, and in the present invention, said mixture is treated as a compound having substituents the number of which is an average value.

b is 0.00 or more and less than 3.90, c is 0.10 or more and less than 4.00, and the sum of b and c is more than 3.00 and less than 4.00, as an average value. More preferably, b is 0 or more and 3.7 or less, c is 0.1 or more and 3.8 or less, and the sum of b and c is 3.1 or more and 3.8 or less. More preferably, b is 2.05 or more and 3.25 or less, c is 0.5 or more and 1.1 or less, and the sum of b and c is 3.1 or more and 3.8 or less. Further preferably, b is 2.15 or more and 3 or less, c is 0.6 or more and 1 or less, and the sum of b and c is 3.1 or more and 3.8 or less and preferably 3.15 or more and 3.5 or less.

In this regard, the number of the nitrogen-containing heteroaromatic ring for the rings A to D is more than 0.00 and less than 1.00 as an average value, the number of the benzene ring is more than 3.00 and less than 4.00, and in the porphyrazine coloring matter of the present invention, the sum of b and c is identical to the number of the benzene ring.

Preferably, when the number of the nitrogen-containing heteroaromatic ring is 0.2 to 0.9 and the number of the benzene ring is 3.1 to 3.8 for the rings A to D, b is 0.0 to 3.7, c is 0.1 to 3.8, and the sum of b and c is 3.1 to 3.8, and preferably b is 2.05 to 3.25, c is 0.5 to 1.1, and the sum of b and c is 3.1 to 3.8.

More preferably, when the number of the nitrogen-containing heteroaromatic ring is 0.20 or more and 0.85 or less and the number of the benzene ring is 3.15 or more and 3.80 or less for the rings A to D, b is 1.85 or more and 3.50 or less, c is 0.30 or more and 1.30 or less, and the sum of b and c is 3.15 or more and 3.80 or less.

Further preferably, when the number of the nitrogen-containing heteroaromatic ring is 0.25 or more and 0.85 or less and the number of the benzene ring is 3.15 or more and 3.75 or less for the rings A to D, b is 0.00 or more and 3.05 or less, c is 0.10 or more and 3.75 or less, and the sum of b and c is 3.15 or more and 3.75 or less, and preferably b is 2.05 or more and 3.25 or less, c is 0.50 or more and 1.10 or less, and the sum of b and c is 3.15 or more and 3.75 or less.

Particularly preferably, when the number of the nitrogen-containing heteroaromatic ring is 0.50 or more and 0.85 or less and the number of the benzene ring is 3.15 or more and 3.50 or less for the rings A to D, b is 0.00 or more and 3.40 or less, c is 0.10 or more and 3.50 or less, and the sum of b and c is 3.15 or more and 3.50 or less, and preferably b is 2.15 or more and 2.90 or less, c is 0.60 or more and 1.00 or less, and the sum of b and c is 3.15 or more and 3.50 or less.

Meanwhile, both the unsubstituted sulfamoyl group and the substituted sulfamoyl group each substitution number of which is represented by b and c are groups substituted on said benzene ring when the rings A to D are benzene rings, and they are not substituted when the rings A to D are 6-membered nitrogen-containing heteroaromatic rings.

In this regard, in the present description, b, c and the sum of b and c are shown to the first or second decimal place by rounding the number in the second or third decimal place, according to necessity.

A coloring matter as a combination of preferable examples of the rings A to D, E, X, Y, b and c in the above formula (1) is more preferable, and a coloring matter as a combination of more preferable examples thereof is further preferable. The same is true in a combination of further preferable examples thereof, and the like.

Preferable porphyrazine coloring matters of the present invention specifically include as follows. In this regard, the number of the nitrogen-containing heteroaromatic ring or the benzene ring for the rings A to D, b, c and the sum of b and c are all shown as an average value.

(i)

The porphyrazine coloring matter of the above formula (1) or a salt thereof, wherein the rings A to D each independently represents a benzene ring or a 6-membered nitrogen-containing heteroaromatic ring fused to a porphyrazine ring, the number of the nitrogen-containing heteroaromatic ring for the rings A to D is more than 0.00 and less than 1.00 as an average value, and the rest are benzene rings;

E is C2-C12 alkylene;

X and Y are each independently an anilino or naphthylamino group having one group selected from the group consisting of a sulfo group, a carboxy group and a phosphono group as a substituent;

said anilino group or said naphthylamino group may be further substituted by 1 kind or 2 or more kinds of groups selected from the group consisting of a sulfo group, a carboxy group, a phosphono group, a sulfamoyl group, a carbamoyl group, a hydroxy group, an alkoxy group, an amino group, a mono- or dialkylamino group, a mono- or diarylamino group, an acetylamino group, an ureide group, an alkyl group, a nitro group, a cyano group, a halogen atom, an alkylsulfonyl group, an alkylthio group, an aryloxy group and a heterocyclic group as a 5 to 6-membered ring;

b is 0.00 or more and less than 3.90 as an average value;

c is 0.10 or more and less than 4.00 as an average value;

and the sum of b and c is more than 3.00 and less than 4.00 as an average value;

provided that the number of the nitrogen-containing heteroaromatic ring is more than 0.0 and less than 0.5 as an average value when X and Y are each independently an anilino group having 1 to 3 carboxy groups as a substituent, b is 0 or more and up to 3.4 as an average value;

c is 0.1 or more and up to 3.5 as an average value;

and the sum of b and c is from 1.0 to 3.5.

(ii)

The porphyrazine coloring matter or a salt thereof according to the above (i), wherein X and Y are each independently an anilino or naphthylamino group having one sulfo group as a substituent.

(iii)

The porphyrazine coloring matter or a salt thereof according to the above (ii), wherein X and Y are each independently an anilino group substituted by one sulfo group and having no other substituents.

(iv)

The porphyrazine coloring matter or a salt thereof according to any one of the above (i) to (iii), wherein E is C2-C6 alkylene, preferably C2-C4 alkylene, more preferably ethylene or propylene and further preferably ethylene.

(v)

The porphyrazine coloring matter or a salt thereof according to any one of the above (i) to (iv), wherein the 6-membered nitrogen-containing heteroaromatic ring represented by the rings A to D is a pyridine ring or a pyrazine ring.

(vi)

The porphyrazine coloring matter or a salt thereof according to the above (v), wherein the 6-membered nitrogen-containing heteroaromatic ring represented by the rings A to D is a pyridine ring.

(vii)

The porphyrazine coloring matter or a salt thereof according to any one of the above (i) to (vi), wherein the number of the nitrogen-containing heteroaromatic ring is 0.2 or more and 0.9 or less and the number of the benzene ring is 3.1 or more and 3.8 or less for the rings A to D, b is 0.0 or more and 3.7 or less, c is 0.1 or more and 3.8 or less, and the sum of b and c is 3.1 or more and 3.8 or less, and preferably b is 2.05 or more and 3.25 or less, c is 0.5 or more and 1.1 or less, and the sum of b and c is 3.1 or more and 3.8 or less.

(viii)

The porphyrazine coloring matter or a salt thereof according to any one of the above (i) to (vi), wherein the number of the nitrogen-containing heteroaromatic ring is 0.25 or more and 0.85 or less and the number of the benzene ring is 3.15 or more and 3.75 or less for the rings A to D, b is 0.00 or more and 3.05 or less, c is 0.10 or more and 3.75 or less, and the sum of b and c is 3.15 or more and 3.75 or less, and preferably b is 2.05 or more and 3.25 or less, c is 0.50 or more and 1.10 or less, and the sum of b and c is 3.15 or more and 3.75 or less.

(ix)

The porphyrazine coloring matter or a salt thereof according to any one of the above (i) to (vi), wherein the number of the nitrogen-containing heteroaromatic ring is 0.50 or more and 0.85 or less and the benzene ring is 3.15 or more and 3.50 or less for the rings A to D, b is 0.00 or more and 3.40 or less, c is 0.10 or more and 3.50 or less, and the sum of b and c is 3.15 or more and 3.75 or less, and preferably b is 2.15 or more and 2.90 or less, c is 0.60 or more and 1.00 or less, and the sum of b and c is 3.15 or more and 3.50 or less.

(x)

The porphyrazine coloring matter or a salt thereof according to any one of the above (i) to (ix), wherein X and Y are each independently a 3-sulfoanilino group or a 4-sulfoanilino group.

(xi)
The porphyrazine coloring matter or a salt thereof according to the above (x), wherein one of X and Y is a 3-sulfoanilino group and the other is a 4-sulfoanilino group.

The coloring matter represented by the above formula (1) can form a salt using a sulfo group, a carboxy group, a phosphono group and the like contained in the molecule, and when forming a salt, it is preferable to form a salt with each cation of an inorganic metal, ammonia or an organic base.

The inorganic metal includes alkali metals and alkali earth metals. Examples of the alkali metal include lithium, sodium, potassium and the like. The alkali earth metal includes, for example, calcium, magnesium and the like.

The organic base includes particularly organic amines, for example, lower alkylamines having 1 to 3 carbon atoms such as methylamine and ethylamine, and mono-, di- or tri(C1-C4 alkanol)amines such as monoethanolamine, diethanolamine, triethanolamine, monoisopropanolamine, diisopropanolamine and triisopropanolamine.

More preferable salts among them include salts of alkali metals such as sodium, potassium and lithium; quaternary ammonium salts of mono-, di- or tri(lower alkanol having 1 to 4 carbon atoms)amine, such as monoethanolamine, diethanolamine, triethanolamine, monoisopropanolamine, diisopropanolamine and triisopropanolamine; and ammonium salts.

Specific examples of the rings A to D, E, X and Y in the porphyrazine coloring matter represented by the above formula (1) of the present invention and average values of b and c are shown in Table 1.

Examples described below are typical coloring matters to specifically explain the coloring matter of the present invention, and the present invention is not limited to the examples described below.

In Table, the term "2,3-pyrido" represents a pyridine ring fused to the porphyrazine ring at the 2- and 3-positions, the term "benzo" represents a benzene ring fused to the porphyrazine ring as described above, and each numerical value beside said terms represents the number (average value) of each ring of the rings A to D.

TABLE 1

| No. | Ring A to D | E | X | Y | b | c |
|---|---|---|---|---|---|---|
| 1 | 2,3-Pyrido: 0.50 Benzo: 3.50 | Ethylene | 4-sulfoanilino | 3-Sulfoanilino | 2.65 | 0.85 |
| 2 | 2,3-Pyrido: 0.50 Benzo: 3.50 | Ethylene | 6-Sulfo-1-naphthylamino | 2,5-Disulfoanilino | 2.65 | 0.85 |
| 3 | 2,3-Pyrido: 0.50 Benzo: 3.50 | Ethylene | 2,5-Disulfoanilino | 4-Sulfoanilino | 2.65 | 0.85 |
| 4 | 2,3-Pyrido: 0.50 Benzo: 3.50 | Ethylene | 3,6,8-Trisulfo-1-naphthylamino | 2-Carboxyanilino | 2.65 | 0.85 |
| 5 | 2,3-Pyrido: 0.50 Benzo: 3.50 | Ethylene | 3,6,8-Trisulfo-1-naphthylamino | 4-Carboxyanilino | 2.65 | 0.85 |
| 6 | 2,3-Pyrido: 0.50 Benzo: 3.50 | Ethylene | 2,5-Disulfoanilino | 4-Carboxyanilino | 2.65 | 0.85 |
| 7 | 2,3-Pyrido: 0.50 Benzo: 3.50 | Ethylene | 6,8-Disulfo-2-naphthylamino | 4-Sulfoanilino | 2.65 | 0.85 |
| 8 | 2,3-Pyrido: 0.50 Benzo: 3.50 | Ethylene | 3,6-Disulfo-8-hydroxy-1-naphthylamino | 4-Sulfoanilino | 2.65 | 0.85 |
| 9 | 2,3-Pyrido: 0.50 Benzo: 3.50 | Ethylene | 3,8-Disulfo-1-naphthylamino | 2,5-Disulfoanilino | 2.65 | 0.85 |
| 10 | 2,3-Pyrido: 0.50 Benzo: 3.50 | Ethylene | 3,6-Disulfo-1-naphthylamino | 2,4-Disulfoanilino | 2.65 | 0.85 |
| 11 | 2,3-Pyrido: 0.50 Benzo: 3.50 | Ethylene | 3-Sulfoanilino | 3-Sulfoanilino | 2.65 | 0.85 |
| 12 | 2,3-Pyrido: 0.50 Benzo: 3.50 | Ethylene | 3,8-Disulfo-1-naphthylamino | 6,8-Disulfo-2-naphthylamino | 2.65 | 0.85 |
| 13 | 2,3-Pyrido: 0.50 Benzo: 3.50 | Ethylene | 6,8-Disulfo-2-naphthylamino | 6,8-Disulfo-2-naphthylamino | 2.65 | 0.85 |
| 14 | 2,3-Pyrido: 0.50 Benzo: 3.50 | Ethylene | 2-Sulfoanilino | 2-Sulfoanilino | 2.65 | 0.85 |
| 15 | 2,3-Pyrido: 0.50 Benzo: 3.50 | Ethylene | 4-Sulfoanilino | 4-Sulfoanilino | 2.65 | 0.85 |
| 16 | 2,3-Pyrido: 0.75 Benzo: 3.25 | Ethylene | 4-sulfoanilino | 3-Sulfoanilino | 2.40 | 0.85 |
| 17 | 2,3-Pyrido: 0.75 Benzo: 3.25 | Ethylene | 6-Sulfo-1-naphthylamino | 2,5-Disulfoanilino | 2.40 | 0.85 |
| 18 | 2,3-Pyrido: 0.75 Benzo: 3.25 | Ethylene | 2,5-Disulfoanilino | 4-Sulfoanilino | 2.40 | 0.85 |
| 19 | 2,3-Pyrido: 0.75 Benzo: 3.25 | Ethylene | 3,6,8-Trisulfo-1-naphthylamino | 2-Carboxyanilino | 2.40 | 0.85 |
| 20 | 2,3-Pyrido: 0.75 Benzo: 3.25 | Ethylene | 3,6,8-Trisulfo-1-naphthylamino | 4-Carboxyanilino | 2.40 | 0.85 |
| 21 | 2,3-Pyrido: 0.75 Benzo: 3.25 | Ethylene | 2,5-Disulfoanilino | 4-Carboxyanilino | 2.40 | 0.85 |
| 22 | 2,3-Pyrido: 0.75 Benzo: 3.25 | Ethylene | 6,8-Disulfo-2-naphthylamino | 4-Sulfoanilino | 2.40 | 0.85 |
| 23 | 2,3-Pyrido: 0.75 Benzo: 3.25 | Ethylene | 3,6-Disulfo-8-hydroxy-1-naphthylamino | 4-Sulfoanilino | 2.40 | 0.85 |
| 24 | 2,3-Pyrido: 0.75 Benzo: 3.25 | Ethylene | 3,8-Disulfo-1-naphthylamino | 2,5-Disulfoanilino | 2.40 | 0.85 |
| 25 | 2,3-Pyrido: 0.75 Benzo: 3.25 | Ethylene | 3,6-Disulfo-1-naphthylamino | 2,4-Disulfoanilino | 2.40 | 0.85 |
| 26 | 2,3-Pyrido: 0.75 Benzo: 3.25 | Ethylene | 3-Sulfoanilino | 3-Sulfoanilino | 2.40 | 0.85 |

TABLE 1-continued

| No. | Ring A to D | E | X | Y | b | c |
|---|---|---|---|---|---|---|
| 27 | 2,3-Pyrido: 0.75 Benzo: 3.25 | Ethylene | 3,8-Disulfo-1-naphthylamino | 6,8-Disulfo-2-naphthylamino | 2.40 | 0.85 |
| 28 | 2,3-Pyrido: 0.75 Benzo: 3.25 | Ethylene | 6,8-Disulfo-2-naphthylamino | 6,8-Disulfo-2-naphthylamino | 2.40 | 0.85 |
| 29 | 2,3-Pyrido: 0.75 Benzo: 3.25 | Ethylene | 2-Sulfoanilino | 2-Sulfoanilino | 2.40 | 0.85 |
| 30 | 2,3-Pyrido: 0.75 Benzo: 3.25 | Ethylene | 4-Sulfoanilino | 4-Sulfoanilino | 2.40 | 0.85 |
| 31 | 2,3-Pyrido: 0.85 Benzo: 3.15 | Ethylene | 4-sulfoanilino | 3-Sulfoanilino | 2.30 | 0.85 |
| 32 | 2,3-Pyrido: 0.85 Benzo: 3.15 | Ethylene | 6-Sulfo-1-naphthylamino | 2,5-Disulfoanilino | 2.30 | 0.85 |
| 33 | 2,3-Pyrido: 0.85 Benzo: 3.15 | Ethylene | 2,5-Disulfoanilino | 4-Sulfoanilino | 2.30 | 0.85 |
| 34 | 2,3-Pyrido: 0.85 Benzo: 3.15 | Ethylene | 3,6,8-Trisulfo-1-naphthylamino | 2-Carboxyanilino | 2.30 | 0.85 |
| 35 | 2,3-Pyrido: 0.85 Benzo: 3.15 | Ethylene | 3,6,8-Trisulfo-1-naphthylamino | 4-Carboxyanilino | 2.30 | 0.85 |
| 36 | 2,3-Pyrido: 0.85 Benzo: 3.15 | Ethylene | 2,5-Disulfoanilino | 4-Carboxyanilino | 2.30 | 0.85 |
| 37 | 2,3-Pyrido: 0.85 Benzo: 3.15 | Ethylene | 6,8-Disulfo-2-naphthylamino | 4-Sulfoanilino | 2.30 | 0.85 |
| 39 | 2,3-Pyrido: 0.85 Benzo: 3.15 | Ethylene | 3,6-Disulfo-8-hydroxy-1-naphthylamino | 4-Sulfoanilino | 2.30 | 0.85 |
| 39 | 2,3-Pyrido: 0.85 Benzo: 3.15 | Ethylene | 3,8-Disulfo-1-naphthylamino | 2,5-Disulfoanilino | 2.30 | 0.85 |
| 40 | 2,3-Pyrido: 0.85 Benzo: 3.15 | Ethylene | 3,6-Disulfo-1-naphthylamino | 2,4-Disulfoanilino | 2.30 | 0.85 |
| 41 | 2,3-Pyrido: 0.85 Benzo: 3.15 | Ethylene | 3-Sulfoanilino | 3-Sulfoanilino | 2.30 | 0.85 |
| 42 | 2,3-Pyrido: 0.85 Benzo: 3.15 | Ethylene | 3,8-Disulfo-1-naphthylamino | 6,8-Disulfo-2-naphthylamino | 2.30 | 0.85 |
| 43 | 2,3-Pyrido: 0.85 Benzo: 3.15 | Ethylene | 6,8-Disulfo-2-naphthylamino | 6,8-Disulfo-2-naphthylamino | 2.30 | 0.85 |
| 44 | 2,3-Pyrido: 0.85 Benzo: 3.15 | Ethylene | 2-Sulfoanilino | 2-Sulfoanilino | 2.30 | 0.85 |
| 45 | 2,3-Pyrido: 0.85 Benzo: 3.15 | Ethylene | 4-Sulfoanilino | 4-Sulfoanilino | 2.30 | 0.85 |
| 46 | 2,3-Pyrido: 0.25 Benzo: 3.75 | Ethylene | 4-sulfoanilino | 3-Sulfoanilino | 2.90 | 0.85 |
| 47 | 2,3-Pyrido: 0.25 Benzo: 3.75 | Ethylene | 6-Sulfo-1-naphthylamino | 2,5-Disulfoanilino | 2.90 | 0.85 |
| 48 | 2,3-Pyrido: 0.25 Benzo: 3.75 | Ethylene | 2,5-Disulfoanilino | 4-Sulfoanilino | 2.90 | 0.85 |
| 49 | 2,3-Pyrido: 0.25 Benzo: 3.75 | Ethylene | 3,6,8-Trisulfo-1-naphthylamino | 2-Carboxyanilino | 2.90 | 0.85 |
| 50 | 2,3-Pyrido: 0.25 Benzo: 3.75 | Ethylene | 3,6,8-Trisulfo-1-naphthylamino | 4-Carboxyanilino | 2.90 | 0.85 |
| 51 | 2,3-Pyrido: 0.25 Benzo: 3.75 | Ethylene | 2,5-Disulfoanilino | 4-Carboxyanilino | 2.90 | 0.85 |
| 52 | 2,3-Pyrido: 0.25 Benzo: 3.75 | Ethylene | 6,8-Disulfo-2-naphthylamino | 4-Sulfoanilino | 2.90 | 0.85 |
| 53 | 2,3-Pyrido: 0.25 Benzo: 3.75 | Ethylene | 3,6-Disulfo-8-hydroxy-1-naphthylamino | 4-Sulfoanilino | 2.90 | 0.85 |
| 54 | 2,3-Pyrido: 0.25 Benzo: 3.75 | Ethylene | 3,8-Disulfo-1-naphthylamino | 2,5-Disulfoanilino | 2.90 | 0.85 |
| 55 | 2,3-Pyrido: 0.25 Benzo: 3.75 | Ethylene | 3,6-Disulfo-1-naphthylamino | 2,4-Disulfoanilino | 2.90 | 0.85 |
| 56 | 2,3-Pyrido: 0.25 Benzo: 3.75 | Ethylene | 3-Sulfoanilino | 3-Sulfoanilino | 2.90 | 0.85 |
| 57 | 2,3-Pyrido: 0.25 Benzo: 3.75 | Ethylene | 3,8-Disulfo-1-naphthylamino | 6,8-Disulfo-2-naphthylamino | 2.90 | 0.85 |
| 58 | 2,3-Pyrido: 0.25 Benzo: 3.75 | Ethylene | 6,8-Disulfo-2-naphthylamino | 6,8-Disulfo-2-naphthylamino | 2.90 | 0.85 |
| 59 | 2,3-Pyrido: 0.25 Benzo: 3.75 | Ethylene | 2-Sulfoanilino | 2-Sulfoanilino | 2.90 | 0.85 |
| 60 | 2,3-Pyrido: 0.25 Benzo: 3.75 | Ethylene | 4-Sulfoanilino | 4-Sulfoanilino | 2.90 | 0.85 |

The porphyrazine coloring matter of the present invention can be usually used without mixing another coloring matter, but in some cases, it can be mixed with a known cyan coloring matter in the range not undermining the effects of the present invention and used.

When mixed with a known cyan coloring matter and used, a coloring matter to be mixed is preferably a phthalocyanine-based coloring matter.

The method for producing the coloring matter represented by the above formula (1) will be explained.

The coloring matter represented by the above formula (1) of the present invention can be obtained by reaction of a porphyrazine compound represented by the above formula (3) with an organic amine represented by the above formula (4) in the presence of ammonia.

The porphyrazine compound represented by the above formula (3) can be obtained by synthesis of a compound represented by the following formula (6) in a known method or a method based on it and then by chlorosulfonylation of this.

That is, the compound represented by the following formula (6) can be synthesized in accordance with the known method disclosed in, for example, WO 2007/091631 and WO 2007/116933. These known literatures do not disclose a method for producing compounds where the number of the nitrogen-containing heteroaromatic ring for the rings A to D is less than 1. However, when synthesis is carried out by the known nitrile method or Wyler method, changing the mixing ratio of a dicarboxylic acid derivative of the nitrogen-containing heteroaromatic ring and a phthalic acid derivative which are used as a reaction raw material allows synthesis of a compound represented by the formula (6) where the number of the nitrogen-containing heteroaromatic ring for the rings A to D less than 1. In this regard, the obtained compound represented by the formula (6) can be a mixture of positional isomers relating to substitution positions of the nitrogen-containing heteroaromatic ring for the rings A to D and substitution positions of the nitrogen atom in the nitrogen-containing heteroaromatic ring, which is also as described in the above known literatures.

In the porphyrazine coloring matter of the present invention, the number of the nitrogen-containing heteroaromatic ring for the rings A to D is less than 1 as an average value, whereby the compound represented by the following formula (6) is a mixture of a porphyrazine coloring matter where all the rings A to D are benzene rings and a porphyrazine coloring matter where one (main component) or two or more of the rings A to D are 6-membered nitrogen-containing heteroaromatic rings.

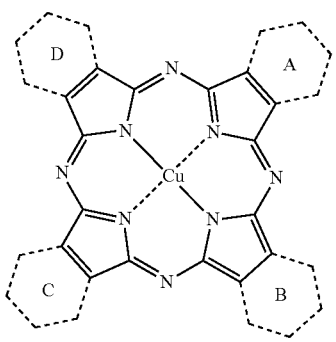

(6)

[wherein, the rings A to D have the same meanings as above.]

The porphyrazine compound represented by the above formula (3) can be obtained by chlorosulfonylation of a compound represented by the above-described formula (6) according to the known method disclosed in WO 2007/091631 and WO 2007/116933 or a method based on it. The chlorosulfonyl group in the formula (3) is introduced on the benzene ring for the rings A to D, but when the rings A to D correspond to the nitrogen-containing heteroaromatic ring group, it is not introduced on the nitrogen-containing heteroaromatic ring. On one benzene ring, usually one chlorosulfonyl group is introduced, so the number of n in the formula (3) is within the number of the benzene ring for the rings A to D. Therefore, the number "n" of the chlorosulfonyl group in the formula (3) is more than 3.00 and less than 4.00 according to the number of the benzene ring in the porphyrazine compound represented by the formula (3). In addition, the number of n in the formula (3) is preferably 3.05 or more and 3.90 or less, more preferably 3.10 or more and 3.80 or less, further preferably 3.15 or more and 3.75 or less and particularly preferably 3.15 or more and 3.50 or less, according to the number of the benzene rings for the rings A to D.

The synthesis method of a porphyrazine compound represented by the formula (3) other than those above includes the following method. By prior cyclocondensation of sulfophthalic acid having a sulfo group with a nitrogen-containing heteroaromatic ring dicarboxylic acid derivative such as quinolinic acid to synthesize a porphyrazine compound having a sulfo group, and then by conversion of the sulfo group in said compound to a chlorosulfonyl group with a suitable chlorinating agent such as thionyl chloride, an intended porphyrazine compound represented by the formula (3) can be also obtained. In this case, by selecting, as a synthesis raw material, a sulfophthalic acid where the substitution position of the sulfo group is the 3-position and a sulfophthalic acid where the substitution position of the sulfo group is the 4-position, the substitution position of the sulfo group introduced on a porphyrazine compound represented by the formula (3) can be controlled. Specifically, the sulfo group can be selectively introduced on the "alpha" position in the following formula (10) by using 3-sulfophthalic acid or on the "beta" position by using 4-sulfophthalic acid, likewise respectively. In this regard, in the present description, the terms "the alpha position of the porphyrazine ring" and "the beta position of the porphyrazine ring" mean the corresponding positions in the following formula (10), unless otherwise specifically noted.

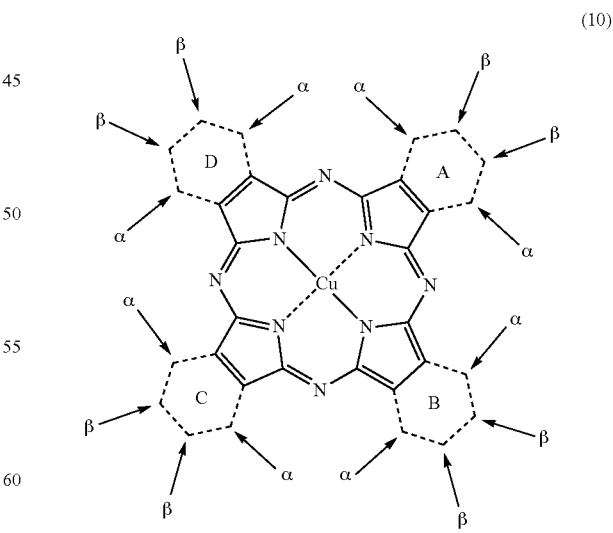

(10)

On the other hand, the organic amine represented by the above formula (4) can be produced by a known method.

For example, 0.95 to 1.1 moles of an aniline or a naphthylamine corresponding to X and 1 mole of 2,4,6-trichloro-S- triazine (cyanuric chloride) are reacted in water under the conditions of around pH 2.5 to 7 and a reaction temperature of 0 to 40° C. for 2 to 12 hours to obtain a first condensate.

Subsequently, 0.95 to 1.1 moles of an aniline or a naphthylamine corresponding Y is added to the reaction liquid of the first condensate, and the mixture is reacted under the conditions of around pH 4 to 10 and a reaction temperature of 5 to 80° C. for 0.5 to 12 hours to obtain a second condensate. Subsequently, 1 mole of the obtained second condensate and 1 to 50 moles of an alkylene diamine corresponding to E are reacted under the conditions of around pH 9 to 12 and a reaction temperature of 5 to 90° C. for 0.5 to 12 hours to obtain an organic amine represented by the above formula (4). For pH adjustment in each condensation, an alkali metal hydroxide such as sodium hydroxide and potassium hydroxide, an alkali metal carbonate such as sodium carbonate and potassium carbonate, or the like is usually used. In this regard, it is good to appropriately determine the order of condensation according to the reactivity of each compound to be condensed with cyanuric chloride, and the order is not limited to the order described above.

The reaction of a porphyrazine compound represented by the above formula (3) with an organic amine represented by the above formula (4) is carried out in the presence of ammonia in a water solvent under the reaction conditions of around pH 8 to 10 and 5 to 70° C. for 1 to 20 hours. By this reaction, an intended coloring matter of the present invention represented by the formula (1) is obtained.

In the above-described reaction, ammonia and a compound generating ammonia by neutralization or decomposition (these both are together referred to as "aminating agent") can be used. The aminating agent used in the above-described reaction includes, for example, compounds generating ammonia by neutralization, like ammonium salts such as ammonium chloride and ammonium sulfate; compounds generating ammonia by heat-decomposition of urea or the like; ammonia gas; and the like, but not limited thereto. The aminating agent used in the above-described reaction is preferably ammonia water. In said reaction, concentrated ammonia water which can be available as a commercial product (which is, usually, commercially available as about 28% ammonia water) or a diluent where this is diluted with water according to necessity may be used.

The use amount of an organic amine represented by the above formula (4) is usually 1 mole or more as the theoretical value [which is the calculated moles of an organic amine represented by the formula (4), in need for obtaining a value of c in an intended coloring matter represented by the formula (1)] relative to usually 1 mole of a porphyrazine compound represented by the above formula (3), but not limited thereto because it varies depending on the reactivity of the organic amine used and the reaction conditions. The use amount of an organic amine represented by the above formula (4) is usually 0.3 to 3 moles and preferably about 0.5 to 2 moles, as the theoretical value described above.

The product obtained by reaction of a compound represented by the above formula (3), an organic amine represented by the above formula (4) and an aminating agent is not a single compound but a mixture of compounds having different values of b and c. However, as long as the average values of b and c of each compound is included in the above range, the object of the present invention can be achieved. Therefore, there is no problem in treating a mixture of them as a compound having b and c values represented as an average value.

In addition, the coloring matter of the present invention represented by the above formula (1) is synthesized from compounds represented by the above formula (3) and the above formula (4) under the reaction conditions not particularly requiring anhydrous condition, and it is preferably synthesized using a water solvent. For this reason, it is theoretically considered that a compound where some chlorosulfonyl groups in the formula (3) is subjected to hydrolyzation by water mixed in the reaction system and converted to sulfonic acid is by-produced, and as a result, said side product comes to be mixed into an intended coloring matter represented by the formula (1).

However, it is difficult to distinguish the unsubstituted sulfamoyl group and the sulfo group by mass spectrometry, whereby in the present invention, all chlorosulfonyl groups in the formula (3) other than those reacted with an organic amine represented by the formula (4) are described as being converted into unsubstituted sulfamoyl groups.

In addition, impurities where some of the coloring matter represented by the above formula (1) form a dimer (for example, Pz-L-Pz) or trimer of copper porphyrazine ring (Pz) through a divalent linking group (L) are by-produced, and said side products sometimes come to be mixed with a reaction product.

The divalent linking group represented by L described above includes —$SO_2$—, —$SO_2$—NH—$SO_2$— or the like. In the case of a trimer, a by-product having these two Ls in combination is also occasionally formed.

The thus obtained porphyrazine coloring matter of the present invention can be separated by filtration or the like after aciding out or salting out. It is preferred that salting out is carried out in, for example, an acidic to alkaline condition and preferably in the range of pH 1 to 11. The temperature in salting out is not particularly limited but usually 40 to 80° C. and preferably 50 to 70° C. Specifically, it is preferred that salting out is carried out by heating a reaction liquid containing the porphyrazine coloring matter of the present invention to the temperature described above and then by adding sodium chloride or the like to adjust the pH in the range described above.

The coloring matter represented by the above formula (1) of the present invention which is synthesized by the method described above is obtained in free acid form or its salt form. In order to give the free acid, for example, aciding out may be carried out. On the other hand, in order to give a salt thereof, salting out may be carried out. When an intended salt is not obtained by salting out, for example, a usual salt exchange method may be utilized, such as a method where a desirable organic or inorganic base is added to a free acid thereof.

Next, the ink composition of the present invention will be explained. The coloring matter of the present invention represented by the above formula (1) produced by the method described above has a vivid cyan color. Therefore, the ink composition containing these can be mainly used as a cyan color ink. Said ink may used not only as a cyan ink having a high concentration but also as an cyan ink having a low coloring matter concentration (which is referred to as light cyan ink, photo cyan ink or the like) used to smoothly reproduce gradation part of image or to reduce granular appearance in hypochromic regions. In addition, it may be also used as a green color ink by mixing with a yellow coloring matter or as a violet or blue color ink by mixing with a magenta coloring matter. Further, it can be also used as a dark yellow, gray or black color by mixing multiple colors to make an ink.

The ink composition of the present invention is prepared by using water as a medium.

When this ink composition is used as an ink for inkjet, the porphyrazine coloring matter of the present invention contained therein is preferably one where the content of anions such as $Cl^-$ and $SO_4^{2-}$ is less. Only as a guide for the anion content, the total content of $Cl^-$ and $SO_4^{2-}$ in the total mass of said coloring matter is 5% by mass or less, preferably 3% by mass or less and further preferably 1% by mass or less, and the content in an ink composition is 1% by mass or less relative to the total mass of the ink composition. The lower limit may be the detection limit or less of an detection apparatus, specifically 0%.

In order to produce a porphyrazine coloring matter of the present invention having less $Cl^-$ and $SO_4^{2-}$, desalting treatment may be carried out by a method such as an ordinary method using, for example, a reverse osmosis membrane or a method where a dried form or a wet cake of the porphyrazine coloring matter of the present invention is stirred in aqueous alcohol.

In the case of the latter, alcohol to be used is C1-C4 alcohol, preferably C1-C3 alcohol and further preferably methanol, ethanol, n-propanol or 2-propanol. A method can be employed, where aqueous alcohol containing a coloring matter to be subjected to desalination is heated nearly to the boiling point and then cooled for carrying out desalination.

The porphyrazine coloring matter of the present invention subjected to desalting treatment in aqueous alcohol can be also obtained as a coloring matter in a dry state by separating by filtration and drying in a conventional manner.

The content of $Cl^-$ and $SO_4^{2-}$ in said coloring matter is measured by, for example, ion chromatography.

When the ink composition of the present invention is used for application of inkjet recording, it is preferable that in the porphyrazine coloring matter of the present invention contained in said ink composition, the content of impurities other than the above-described $Cl^-$ and $SO_4^{2-}$, such as heavy metals such as zinc and iron, ions such as calcium, silica and the like is also less.

However, the porphyrazine of the present invention has a central metal through an ionic bond, a coordination bond and the like and forms a copper complex, and this central metal is not included in the impurities.

Only as a guide for the above-described impurity content, each content of heavy metals such as zinc and iron, ions such as calcium, silica and the like in a dried and purified product of said porphyrazine coloring matter is, for example, preferably about 500 ppm or less, and the lower limit may be the detection limit or less of an analysis equipment, specifically 0 ppm.

The ion content of the heavy metal or the like can be measured by ion chromatography, atomic absorption method or ICP (Inductively Coupled Plasma) emission spectrometry.

The ink composition of the present invention contains 0.1 to 8% by mass and preferably 0.3 to 6% by mass of a porphyrazine coloring matter represented by the above formula (1).

This ink composition may contain, according to necessity, a water-soluble organic solvent within the range not undermining the effects of the present invention. The water-soluble organic solvent is sometimes used for the purpose of providing functions such as dye-dissolving, dry-preventing (moistening), viscosity modifying, penetration-enhancing, surface tension-controlling and antifoaming. The ink composition of the present invention preferably contains a water-soluble organic solvent.

In addition to it, for example, an antiseptic and fungicide, a pH adjuster, a chelating agent, a rust preventive agent, an ultraviolet absorbing agent, a viscosity modifier, a dye dissolving agent, an antifading agent, an emulsion stabilizer, a surface tension-controlling agent, an antifoaming agent, a dispersing agent, a dispersion stabilizer and the like may be added as an ink preparation agent, according to necessity.

It is better that the ink composition of the present invention contains a water-soluble organic solvent in an amount of 0 to 60% by mass and preferably 10 to 50% by mass and an ink preparation agent in an amount of 0 to 20% by mass and preferably 0 to 15% by mass, respectively based on the total mass of the ink composition. The rest other than the water-soluble organic solvent, the ink preparation agent and the porphyrazine coloring matter of the present invention is water.

The water-soluble organic solvent described above includes, for example, C1-C4 alcohols such as methanol, ethanol, n-propanol, isopropanol, n-butanol, isobutanol, secondary butanol or tertiary butanol; carboxylic acid amides such as N,N-dimethylformamide or N,N-dimethylacetoamide; heterocyclic ketones such as 2-pyrrolidone, N-methyl-2-pyrrolidone, 1,3-dimethylimidazolidin-2-one or 1,3-dimethylhexahydropyrimid-2-one; ketones or keto alcohols such as acetone, methyl ethyl ketone or 2-methyl-2-hydroxypentan-4-one; cyclic ethers such as tetrahydrofuran or dioxane; mono-, oligo- or polyalkylene glycols or thioglycols having a C2-C6 alkylene unit, such as ethylene glycol, 1,2- or 1,3-propylene glycol, 1,2- or 1,4-butylene glycol, 1,6-hexylene glycol, diethylene glycol, triethylene glycol, tetraethylene glycol, dipropylene glycol, thiodiglycol, polyethylene glycol or polypropylene glycol; polyols such as glycerine and hexane-1,2,6-triol (preferably, C3-C6 triol); C1-C4 monoalkyl ethers of polyhydric alcohols such as ethylene glycol monomethyl ether, ethylene glycol monoethyl ether, diethylene glycol monomethyl ether, diethylene glycol monoethyl ether, diethylene glycol monobutyl ether (butyl carbitol), triethylene glycol monomethyl ether or triethylene glycol monoethyl ether; gamma-butyrolactone or dimethylsulfoxide; and the like.

The water-soluble organic solvent described above is preferably isopropanol, glycerine, mono-, di- or triethylene glycol, dipropylene glycol, 2-pyrrolidone and N-methyl-2-pyrrolidone, and more preferably isopropanol, glycerine, diethylene glycol, 2-pyrrolidone or butyl carbitol.

These water-soluble organic solvents are used alone or as a mixture thereof.

The antiseptic and fungicide includes, for example, compounds of organic sulfur-type, organic nitrogen sulfur-type, organic halogen-type, haloaryl sulfone-type, iodopropargyl-type, N-haloalkylthio-type, benzothiazole-type, nitrile-type, pyridine-type, 8-oxyquinoline-type, isothiazoline-type, dithiol-type, pyridineoxide-type, nitropropane-type, organic tin-type, phenol-type, quaternary ammonium salt-type, triazine-type, thiadiazine-type, anilide-type, adamantane-type, dithiocarbamate-type, brominated indanone-type, benzyl bromoacetate-type, inorganic salt-type and the like.

The organic halogen-type compound includes, for example, sodium pentachlorophenol. The pyridineoxide-type compound includes, for example, sodium 2-pyridinethiol-1-oxide. The isothiazoline-type compound includes, for example, 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, 5-chloro-2-methyl-4-isothiazolin-3-one calcium chloride and 2-methyl-4-isothiazolin-3-one calcium chloride and the like.

Specific examples of other antiseptic and fungicides include sodium sorbate, sodium benzoate, sodium acetate and the like, and as a commercial product, for example, Proxel® GXL (S) and Proxel® XL-2 (S) which are trade names and manufactured by Arch Chemicals Japan, Inc., and the like.

In this regard, the superscript "®" in the present description represents a registered trademark.

The pH adjuster is used for the purpose of improving ink storage stability and can be any substance as long as it can control the ink pH in the range of 6.0 to 11.0. It includes, for example, alkanolamines such as diethanolamine or triethanolamine; alkali metal hydroxides such as lithium hydroxide, sodium hydroxide or potassium hydroxide; ammonium hydroxide (ammonia water); alkali metal carbonates such as lithium carbonate, sodium carbonate or potassium carbonate; or the like.

The chelating agent includes, for example, sodium ethylenediaminetetraacetate, sodium nitrilotriacetate, sodium hydroxyethylethylenediaminetriacetate, sodium diethylenetriaminepentaacetate, sodium uracil diacetate and the like. The rust preventive agent includes, for example, hydrogen sulfite salt, sodium thiosulfate, ammonium thioglycolate, diisopropylammonium nitrite, pentaerythritol tetranitrate, dicyclohexylammonium nitrite and the like.

The ultraviolet absorbing agent includes, for example, benzophenone-type compounds, benzotriazole-type compounds, cinnamic acid-type compounds, triazine-type compounds, stilbene-type compounds and the like. In addition, compounds absorbing ultraviolet rays and emitting fluorescence, typified by benzoxazole-type compounds, so-called fluorescent brightening agent, can be used.

The viscosity modifier includes, water-soluble organic solvents and in addition, water-soluble polymer compounds, for example, polyvinyl alcohol, cellulose derivatives, polyamine, polyimine and the like.

The dye dissolving agent includes, for example, urea, epsilon-caprolactam, ethylene carbonate and the like.

The antifading agent is used for the purpose of improving image storage stability. As the antifading agent, various organic-type agents and metal complex-type antifading agents can be used. The organic antifading agent includes hydroquinones, alkoxyphenols, dialkoxyphenols, phenols, anilines, amines, indanes, chromans, alkoxyanilines, heterocycles and the like, and the metal complex includes nickel complexes, zinc complexes and the like.

The surface tension-controlling agent includes surfactants, for example, anionic surfactants, amphoteric surfactants, cationic surfactants, nonionic surfactant, and the like.

The anionic surfactants include alkylsulfocarboxylate, alpha-olefin sulfonate, polyoxyethylene alkyl ether acetate, N-acylamino acid and salts thereof, N-acylmethyltaurine salt, alkylsulfate polyoxyalkyl ether sulfate, alkylsulfate polyoxyethylene alkyl ether phosphate, rosin acid soap, castor oil sulfate, lauryl alcohol sulfate, alkylphenol type phosphate ester, alkyl-type phosphate ester, alkylaryl sulfonate, diethyl sulfosuccinate, diethylhexyl sulfosuccinate, dioctyl sulfosuccinate and the like.

The cationic surfactants include 2-vinylpyridine derivatives and poly(4-vinylpyridine) derivatives and the like.

The amphoteric surfactants include lauryldimethylaminoacetic acid betaine, 2-alkyl-N-carboxymethyl-N-hydroxyethyl imidazolinium betaine, coconut oil fatty acid amide propyldimethylaminoacetic acid betaine, polyoctylpolyaminoethylglycine, and in addition, imidazoline derivatives and the like.

The nonionic surfactants include ether-type such as polyoxyethylene nonylphenyl ether, polyoxyethylene octylphenyl ether, polyoxyethylene dodecylphenyl ether, polyoxyethylene oleyl ether, polyoxyethylene lauryl ether and polyoxyethylene alkyl ether; ester-type such as polyoxyethylene oleate ester, polyoxyethylene distearate ester, sorbitan laurate, sorbitan monostearate, sorbitan monooleate, sorbitan sesquioleate, polyoxyethylene monooleate and polyoxyethylene stearate; acetylene alcohol-type such as 2,4,7,9-tetramethyl-5-decyne-4,7-diol, 3,6-dimethyl-4-octyne-3,6-diol and 3,5-dimethyl-1-hexyn-3-ol (for example, Surfynol® 104, 82 and 465, Olfine STG, and the like manufactured by Nissin Chemical Industry Co., Ltd.); and the like.

As the antifoaming agent, highly oxidized oil-type, glycerin fatty acid ester-type, fluorine-type and silicone-type compounds can be used according to necessity.

These ink preparation agents are used alone or as a mixture thereof. In this regard, the surface tension of the ink of the present invention is usually 25 to 70 mN/m and more preferably 25 to 60 mN/m. In addition, the viscosity of the ink of the present invention is preferably 30 mPa·s or less. Further, it is more preferably adjusted to 20 mPa·s or less.

In production of the ink composition of the present invention, the order of dissolving the agents is not particularly limited. The water used for preparation of the ink composition is preferably water with less impurity, such as ion-exchanged water or distilled water. In addition, foreign substances may be removed by microfiltration using a membrane filter according to necessity, and it is preferred to carry out microfiltration when using as an ink for inkjet printer. The pore size of the filter for microfiltration is usually 1 µm to 0.1 µm and preferably 0.8 µm to 0.1 µm.

The ink composition of the present invention can be used not only for monochrome image formation but also for full color image formation. In order to form full color images, it is also used as an ink set of 3 primary colors together with a magenta ink and a yellow ink, and further as an ink set of 4 colors by adding a black ink thereto. In addition, in order to form higher resolution images, it is also used as an ink set in combination with a light magenta ink, a blue ink, a green ink, an orange ink, a dark yellow ink, a gray ink and/or the like. Coloring matters of each color used for the ink sets in combination with the ink composition of the present invention include known coloring matters.

The known coloring matters for the yellow ink described above can include, for example, azo-based coloring matters having aryl and/or heteroaryl; methine-type coloring matters such as benzylidene coloring matter and monomethine oxonol coloring matter; quinone-type coloring matters such as naphthoquinone coloring matter and anthraquinone coloring matter; and the like. Other known coloring matters can include quinophthalone-type coloring matters; nitro•nitroso-type coloring matters; acridine-type coloring matters; acridinone-type coloring matters; and the like.

The known coloring matters for the magenta ink described above can include, for example, azo-based coloring matters having aryl and/or heteroaryl; azomethine-type coloring matters; methine-type coloring matters such as arylidene coloring matter, styryl coloring matter, merocyanine coloring matter, cyanine coloring matter and oxonol coloring matter; carbonium-type coloring matters such as diphenyl methane coloring matter, triphenylmethane coloring matter and xanthene coloring matter; quinone-type coloring matters such as naphthoquinone, anthraquinone and anthrapyridone; condensed polycyclic-type coloring matters such as dioxazine coloring matter; and the like.

The known coloring matters for the black ink described above can include azo-based coloring matters such as disazo, trisazo or tetraazo; sulfur dyes; carbon black dispersions; and the like.

The ink composition of the present invention can be used for recording methods such as impress printing, copying, marking, writing, drafting and stamping, and particularly suitable for use in the inkjet recording method.

The inkjet recording method of the present invention is a method where the ink composition of the present invention is used as an ink, energy is provided to said ink responding to a recording signal, and ink drops of said ink are discharged to carry out recording and form images on a known record-receiving material, specifically plain paper, resin-coated paper, inkjet special paper, glossy paper, glossy film, electro-photography paper, fiber or cloth (such as cellulose, nylon and wool), glass, metal, ceramics, leather or the like.

When forming images, a polymer particle dispersion (also referred to as polymer latex) may be used for the purpose of giving glossiness and water fastness and of improving weatherability.

The timing to impart a polymer latex to a record-receiving material may be before, after or at the same time as imparting a colorant.

Therefore, recording may be carried out with the ink composition of the present invention on a record-receiving material containing a polymer latex, or a polymer latex may be contained in said ink composition. Otherwise, a polymer latex may be applied as a single liquid to a record-receiving material before or after carrying out recording with said ink composition on a record-receiving material.

The colored product of the present invention means a product colored with the porphyrazine coloring matter of the present invention or a water-based ink composition containing this. Materials to be colored are not particularly limited but include, for example, communication sheets such as paper and film, fiber and cloth (such as cellulose, nylon and wool), leather, substrates for color filter, and the like. The materials to be colored are preferably communication sheets.

The above-described record-receiving materials or the above-described communication sheets as a colored material are preferably materials subjected to surface treatment, specifically materials provided with an ink-receiving layer on a substrate such as paper, synthetic paper, film or the like. The ink-receiving layer is provided by, for example, impregnating or coating the above-described substrate with a cation-type polymer; coating the above-described substrate surface with inorganic particles (white inorganic pigment particles) which can absorb the coloring matter in the ink, such as porous silica, aluminasol and special ceramics, together with a hydrophilic polymer such as polyvinyl alcohol and polyvinylpyrrolidone; and the like.

The communication sheet provided with such an ink-receiving layer is usually referred to as inkjet special paper (film), glossy paper (film) or the like. Among them, the one regarded as most susceptible to gases having oxidizing effect in the air such as ozone gas is such a type of inkjet special paper that the substrate surface is coated with inorganic particles which can absorb the coloring matter in the ink, such as porous silica, aluminasol and special ceramics.

Typical examples of the above-described inkjet special paper available as a commercial product include Professional Photopaper, Glossy Gold and Glossy professional manufactured by Canon Inc.; Photo Paper CRISPIA (highly glossy), Photo Paper (glossy) and Photo Matte Paper manufactured by Seiko-Epson Corporation; Advanced PhotoPaper (glossy) manufactured by Hewlett Packard Japan, Ltd.; Premium Plus Glossy Photo Paper manufactured by Brother Industries, Ltd.; and the like, which are all trade names. In addition, plain paper can be naturally used. Specifically, PB Paper GF 500 manufactured by Canon Inc.; Both sides-high quality plain paper manufactured by Seiko-Epson Corporation; and the like, which are all trade names, but not limited thereto.

As the coloring method to obtain the above-described colored product of the present invention, any known method may be used. One of preferable coloring methods is a method where the above-described material is colored with the ink of the present invention, using an inkjet printer. The material to be colored may be the above-described material or other material.

In order to carry out recording on the above-described record-receiving material by the inkjet recording method of the present invention, for example, a container containing the above-described ink composition may be put in a predetermined position of an inkjet printer and recording may be carried out in an ordinary method.

The inkjet printer includes, for example, piezo-type printers utilizing mechanical vibration; Bubble Jet®-type printers utilizing bubbles generated by heating; and the like The ink composition of the present invention is free from precipitation or separation during storage. In addition, when said ink composition is used for inkjet recording, it does not cause clogging of the injector (inkhead). The ink composition of the present invention has no change in physical properties even in recording under relatively long hours and constant recirculation by a continuous ink jet printer; intermittent recording by an on-demand printer; and the like.

The ink composition of the present invention has a vivid cyan color, and by using this as an ink, recorded matters excellent in various fastnesses such as light fastness and water fastness, especially excellent in ozone fastness can be obtained. In addition, the ink composition of the present invention has a hue closer to the cyan standard color, whereby it has an excellent balance of hue and ozone fastness. Further, it provides a high print density, whereby it can decrease the coloring matter concentration in ink and thus has an industrial superiority in cost reduction.

In addition, by using it in combination with other magenta and yellow inks, color tone in a wide visible region can be expressed.

Further, by using dark and light cyan inks and in addition, in combination with other yellow and/or magenta inks, and according to necessity, inks of green, red, orange, blue and/or the like excellent in ozone fastness, light fastness and water fastness, color tones in a wider visible region can be also expressed.

EXAMPLES

Hereinafter, the present invention will be more specifically explained with reference to the following Examples. In this regard, "part(s)" and "%" in the context are based on mass unless otherwise specified. In addition, any of the operations such as reaction and crystallization were carried out under stirring unless otherwise specifically noted. Further, "LEO-COL TD-90 (trade name)" used in the synthesis reaction is a surfactant manufactured by Lion Corporation.

Measurement of maximum absorption wavelength ($\lambda$max) in all the compounds in Examples was carried out using an aqueous solution.

The coloring matters represented by the above formula (1) synthesized in Examples are all mixtures containing isomers and the like as described above. Therefore, each structural formula is shown as containing isomers, and the number of the pyridine ring, the number of the benzene ring, b and c, the sum of b and c, and the like are all shown as an average value, as described above. Therefore, each yield is a value containing said isomer and the like contained in each said chemical formula. In addition, the coloring matters of the present invention in Examples are mixtures where the unsubstituted sulfamoyl group and the substituted sulfamoyl group are substituted each independently at the alpha- and beta-positions of the porphyrazine ring respectively in (b) and (c) ratios, and considered as a mixture of about equal parts of the alpha-position substituted product and the beta-position substituted product.

In this regard, the phrase "(20% to the liquid)" and the like means "% by mass" of an added compound relative to the total liquid volume (based on mass) at that point.

In the coloring matters obtained in Examples, when the 6-membered nitrogen-containing heteroaromatic ring for the rings A to D is a pyridine ring, the ring-fusion position of said pyridine ring fused to the porphyrazine ring is the 2- and 3-positions or the 5- and 6-positions. In addition, the numbers of the benzene ring and the 6-membered nitrogen-containing heteroaromatic ring for the rings A to D and the values of b and c are shown to the second decimal place by rounding the number of the third decimal place. The values of b and c can be determined by measurement of the copper content by ICP emission spectrometry using the intended compound as a sample, by measurement of the water content by Karl Fischer method, and by measurement of the content of inorganic impurities (ions such as sodium, potassium and chlorine atom) by ion chromatography.

Meanwhile, all the synthesized porphyrazine coloring matters of the present invention had an extremely high solubility, showing 15% by mass or more relative to the total mass of the aqueous solution.

Example 1

(1) Synthesis of a compound represented by the following formula (6) wherein 0.25 of the rings A to D in the following formula (6) is a pyridine ring and the rest 3.75 are benzene rings.

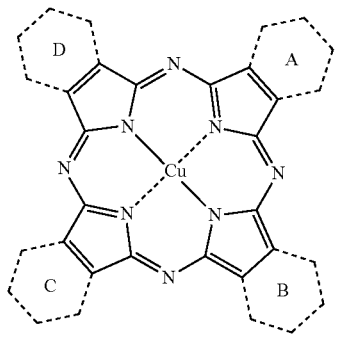

(6)

To a four-neck flask, 375 parts of sulfolane, 41.6 parts of phthalic anhydride, 3.13 parts of quinolinic acid, 108 parts of urea, 10.1 parts of copper (II) chloride and 1.5 parts of ammonium molybdate were added, the liquid temperature was raised to 200° C. and maintained at the same temperature for 5 hours. After completion of the reaction, the mixture was cooled to 65° C., 50 parts of DMF were added to the reaction liquid, and the precipitated solid was separated by filtration. The resulting solid was washed with 50 parts of DMF to obtain 75.2 parts of a wet cake. The whole volume of the obtained wet cake was added to 450 parts of DMF, the liquid temperature was raised to 110° C. and the mixture was maintained at the same temperature for one hour. The solid was separated by filtration and washed with 200 parts of water to obtain a wet cake, which was added to 450 parts of 5% hydrochloric acid, the liquid temperature was raised to 60° C., and the mixture was maintained at the same temperature for 1 hour. The solid was separated by filtration and washed with 200 parts of water to obtain a wet cake, the whole volume of which was added to 450 parts of 5% ammonia water, the mixture was maintained at 60° C. for 1 hour. The solid was separated by filtration and washed with 200 parts of water to obtain 82.6 parts of a wet cake. The obtained wet cake was dried at 80° C. to obtain 26.3 parts of an intended compound as a blue solid.

| Elemental analysis $C_{127}H_{63}N_{33}Cu_4$ | | | | |
|---|---|---|---|---|
| | C | H | N | Cu |
| Theoretical value: | 66.17 | 2.76 | 20.05 | 11.03 |
| Actual value: | 65.79 | 2.95 | 19.81 | 10.94 |

(2) Synthesis of a compound represented by the following formula (3) wherein 0.25 of the rings A to D in the following formula (3) is a pyridine ring, the rest 3.75 are benzene rings, and n is 3.75.

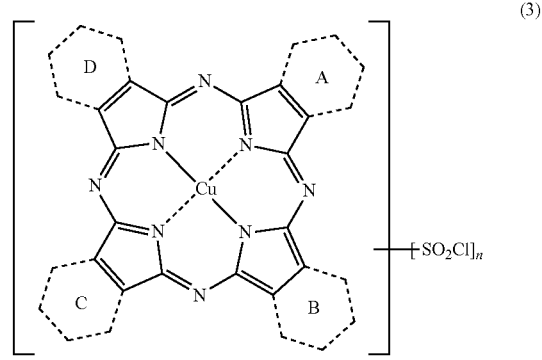

(3)

To 46.2 parts of chlorosulfonic acid, 5.8 parts of the compound obtained in Example 1 (1) were gradually added while stirring at 60° C. or less, and the reaction was carried out at 140° C. for 4 hours. Next, the reaction liquid was cooled to 70° C., 7.14 parts of thionyl chloride were added dropwise over 30 minutes, and the reaction was carried out at 70° C. for 3 hours. The reaction liquid was cooled to 30° C. or less and slowly poured into 800 parts of ice water. The precipitated solid was separated by filtration and washed with 200 parts of cold water to obtain 42.0 parts of a wet cake of an intended compound.

(3) Synthesis of a compound represented by the following formula (15) [compound of the above formula (4) wherein X is 4-sulfoanilino, Y is 3-sulfoanilino, and E is ethylene]

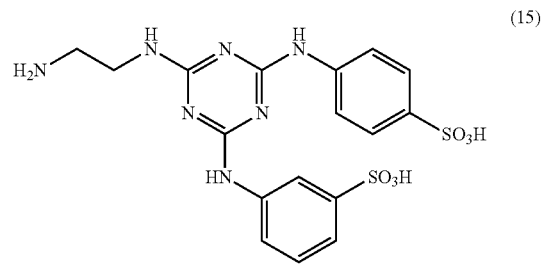 [SMILES: NCCNc1nc(Nc2ccc(S(=O)(=O)O)cc2)nc(Nc2cccc(S(=O)(=O)O)c2)n1]

(15)

To 330 parts of ice water, 18.4 parts of cyanuric chloride and LEOCOL TD-90 (trade name) (0.2 parts) were added and the mixture was stirred at 10° C. or less for 30 minutes. Next, 17.4 parts of 4-sulfoaniline (purity: 99.3%) were added thereto, the reaction was carried out at pH 2.6 to 3.0 and 0 to 5° C. for 1 hour, at pH 3.0 to 3.5 and 0 to 5° C. for 1 hour, and at the same pH and 25 to 30° C. for 1 hour. During this reaction, the pH of the reaction liquid was adjusted using a 10% aqueous sodium hydroxide solution.

To the resulting reaction liquid, 17.4 parts of 3-sulfoaniline (purity: 99.3%) were added and the reaction was carried out at 40° C. for 3 hours while adjusting to pH 5.0 to 6.0 using a 10% aqueous sodium hydroxide solution.

To the reaction liquid, 250 parts of ice were added to cool to 0° C., and 60 parts of ethylenediamine were added dropwise while maintaining 5° C. or less. After that, the reaction liquid was stirred at room temperature overnight and then adjusted to pH 1.0 using concentrated hydrochloric acid. During the addition of concentrated hydrochloric acid, the liquid temperature was maintained at 10 to 15° C. while adding ice to the reaction liquid. The liquid volume of the reaction liquid at this time was 1000 parts. To this reaction liquid, 200 parts of sodium chloride were added and the mixture was stirred for 30 minutes to precipitate a solid.

The precipitated solid was separated by filtration to obtain 85.6 parts of a wet cake. The obtained wet cake was placed into a beaker, 280 parts of water were added thereto, and the mixture was dissolved by adjusting to pH 9.0 using a 10% aqueous sodium hydroxide solution. At this time, the liquid volume was 450 parts. To this reaction liquid, concentrated hydrochloric acid was added to adjust to pH 1.0, and then 90 parts of sodium chloride were added, and the mixture was stirred for 30 minutes to precipitate a solid. The precipitated solid was separated by filtration to obtain 115.1 parts of a wet cake. The obtained wet cake was placed into a beaker, 500 parts of methanol and 100 parts of water were added thereto, and the mixture was stirred at 50° C. for 1 hour. After that, the solid was separated by filtration to obtain 84.1 parts of a wet cake. The obtained wet cake was dried to obtain 44.3 parts of white powder of an intended compound.

(4) Synthesis of a coloring matter of the present invention represented by the following formula (16) [coloring matter of the above formula (1) wherein 0.25 of the rings A to D is a pyridine ring, the rest 3.75 are benzene rings, E is ethylene, X is 4-sulfoanilino, Y is 3-sulfoanilino, b is 2.91, and c is 0.84]

solving 3.4 parts of a compound represented by the formula (15) in 30 parts of water were added to the suspension. While further adding 28% ammonia water thereto, said liquid was maintained at pH 9.0, the liquid temperature was raised to 20° C. over 1 hour, and reaction was carried out at the same temperature for 8 hours. The liquid volume at this time was 250 parts. The temperature of the reaction liquid was raised to 50° C., 50 parts of sodium chloride (20% to the liquid) was added, and the mixture was stirred for 30 minutes and then adjusted to pH 3.0 with concentrated hydrochloric acid over 20 minutes. After that, the precipitated solid was separated by filtration and washed with 100 parts of a 20% aqueous sodium chloride solution to obtain 51.0 parts of a wet cake. The obtained wet cake was added to 200 parts of water, and the mixture was adjusted to pH 9.0 using a 25% aqueous sodium hydroxide solution to dissolve the wet cake. The liquid volume at this time was 260 parts. The temperature of this solution was raised to 50° C., 26 parts of sodium chloride (10% to the liquid) were added, the mixture was stirred for 30 minutes, and then this solution was adjusted to pH 2.0 with concentrated hydrochloric acid over 20 minutes. After that, the precipitated solid was separated by filtration and washed with 100 parts of a 10% aqueous sodium chloride solution to obtain 49.9 parts of a wet cake. The obtained wet cake was added to a mixed liquid of 255 parts of methanol and 45 parts of water, the mixture was stirred at 50° C. for 1 hour, and then the solid was separated by filtration to obtain 38.5 parts of a wet cake. The obtained wet cake was dried to obtain 11.4 parts of an intended coloring matter of the present invention as blue powder.

λmax: 611.0 nm.

Example 2

(1) Synthesis of a compound represented by the above formula (6) wherein 0.75 of the rings A to D in the above formula (6) is a pyridine ring and the rest 3.25 are benzene rings.

To a four-neck flask, 375 parts of sulfolane, 30.8 parts of phthalic anhydride, 9.40 parts of quinolinic acid, 108 parts of

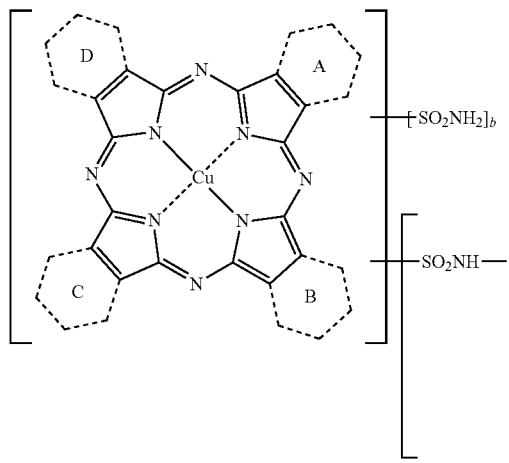
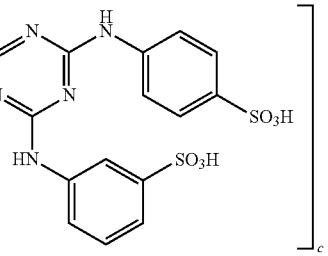

(16)

To 50 parts of ice water, 42.0 parts of the wet cake of the compound obtained in Example 1 (2) were added and the mixture was suspended at 5° C. or less. Ten minutes later, while maintaining the liquid temperature at 10° C. or less, 2 parts of 28% ammonia water and an aqueous solution disurea, 10.1 parts of copper (II) chloride and 1.5 parts of ammonium molybdate were added, the liquid temperature was raised to 200° C., and the mixture was maintained at the same temperature for 5 hours. After completion of the reaction, the solution was cooled to 65° C., 50 parts of DMF were added thereto, and the precipitated solid was separated by filtration. The resulting solid was washed with 50 parts of DMF to obtain 84.2 parts of a wet cake. The whole volume of the obtained wet cake was added to 450 parts of DMF, the liquid temperature was raised to 110° C., and the mixture was maintained at the same temperature for one hour. The solid was separated by filtration and washed with 200 parts of water. Subsequently, the obtained wet cake was added to 450 parts of 5% hydrochloric acid, the liquid temperature was raised to 60° C., and the mixture was maintained at the same temperature for 1 hour. The solid was separated by filtration and washed with 200 parts of water to obtain a wet cake, the whole volume of which was added to 450 parts of 5% ammonia water. The liquid temperature was maintained at 60° C. for 1 hour, and the solid was separated by filtration and washed with 200 parts of water to obtain 79.3 parts of a wet cake. The obtained wet cake was dried at 80° C. to obtain 30.3 parts of an intended compound as a blue solid.

| Elemental analysis $C_{125}H_{61}N_{35}Cu_4$ | | | | |
|---|---|---|---|---|
| | C | H | N | Cu |
| Theoretical value: | 65.07 | 2.67 | 21.25 | 11.02 |
| Actual value: | 64.39 | 2.75 | 20.91 | 10.89 |

(2) Synthesis of a compound represented by the above formula (3) wherein 0.75 of the rings A to D in the above formula (3) is a pyridine ring, the rest 3.25 are benzene rings, and n is 3.25.

To 46.2 parts of chlorosulfonic acid, 5.8 parts of the compound obtained in Example 2 (1) were gradually added at 60° C. or less, and then the reaction was carried out at 140° C. for 4 hours. Next, the reaction liquid was cooled to 70° C., 7.14 parts of thionyl chloride were added dropwise thereto over for 30 minutes, and the reaction was carried out at 70° C. for 3 hours. The reaction liquid was cooled to 30° C. or less and slowly poured into 800 parts of ice water. The precipitated solid was separated by filtration and washed with 200 parts of cold water to obtain 42.3 parts of a wet cake of an intended compound.

(3) Synthesis of a coloring matter of the present invention represented by the above formula (16) [coloring matter of the above formula (1) wherein 0.75 of the rings A to D is a pyridine ring, the rest 3.25 are benzene rings, E is ethylene, X is 4-sulfoanilino, Y is 3-sulfoanilino, b is 2.42, and c is 0.83.]

To 50 parts of ice water, 42.3 parts of the wet cake of the compound obtained in Example 2 (2) were added and suspended at 5° C. or less. Ten minutes later, while maintaining the suspension at 10° C. or less, 2 parts of 28% ammonia water and an aqueous solution dissolving 3.37 parts of a compound represented by the formula (15) in 30 parts of water were added to the suspension. While further adding 28% ammonia water thereto, said liquid was maintained at pH 9.0, the liquid temperature was raised to 20° C. over 1 hour, and the liquid was maintained at the same temperature for 8 hours. The liquid volume at this time was 230 parts. The temperature of the reaction liquid was raised to 50° C., and 46 parts of sodium chloride (20% to the liquid) were added thereto. After the reaction liquid was stirred for 30 minutes, it was adjusted to pH 3.0 over 20 minutes with concentrated hydrochloric acid. Subsequently, the precipitated solid was separated by filtration and washed with 100 parts of a 20% aqueous sodium chloride solution to obtain 51.9 parts of a wet cake. The obtained wet cake was added to 200 parts of water, and the mixture was adjusted to pH 9.0 using a 25% aqueous sodium hydroxide solution to dissolve the wet cake. The liquid volume at this time was 260 parts. The temperature of the solution was raised to 50° C., and 26 parts of sodium chloride (10% to the liquid) were added thereto. After the solution was stirred for 30 minutes, it was adjusted to pH 2.0 over 20 minutes with concentrated hydrochloric acid. Subsequently, the precipitated solid was separated by filtration and washed with 100 parts of a 10% aqueous sodium chloride solution to obtain 48.9 parts of a wet cake. The obtained wet cake was added to a mixed liquid of 255 parts of methanol and 45 parts of water, the mixture was stirred at 50° C. for 1 hour, and then the solid was separated by filtration to obtain 33.5 parts of a wet cake. By drying the obtained wet cake, 10.1 parts of an intended coloring matter of the present invention was obtained as a blue powder.

λmax: 609.5 nm.

Example 3

(1) Synthesis of a compound represented by the above formula (6) wherein 0.85 of the rings A to D in the above formula (6) is a pyridine ring, and the rest 3.15 are benzene rings.

To a four-neck flask, 375 parts of sulfolane, 34.96 parts of phthalic anhydride, 10.65 parts of quinolinic acid, 108 parts of urea, 10.1 parts of copper (II) chloride and 1.5 parts of ammonium molybdate were added, the liquid temperature was raised to 200° C., and the liquid was maintained at the same temperature for 5 hours. After completion of the reaction, the liquid was cooled to 65° C., 50 parts of DMF were added, and the precipitated solid was separated by filtration. The resulting solid was washed with 50 parts of DMF to obtain 79.2 parts of a wet cake. The whole volume of the obtained wet cake was added to 450 parts of DMF, the liquid temperature was raised to 110° C., and the liquid was maintained at the same temperature for one hour. The precipitated solid was separated by filtration and washed with 200 parts of water. Subsequently, the obtained wet cake was added to 450 parts of 5% hydrochloric acid, the liquid temperature was raised to 60° C., and the liquid was maintained at the same temperature for 1 hour. The solid was separated by filtration and washed with 200 parts of water. The whole volume of the obtained wet cake was added to 450 parts of 5% ammonia water, and the mixture was maintained at 60° C. for 1 hour. The solid was separated by filtration and washed with 200 parts of water to obtain 82.6 parts of a wet cake. The obtained wet cake was dried at 80° C. to obtain 29.3 parts of an intended compound as a blue solid.

| Elemental analysis $C_{623}H_{303}N_{177}Cu_{20}$ | | | | |
|---|---|---|---|---|
| | C | H | N | Cu |
| Theoretical value: | 64.85 | 2.65 | 21.49 | 11.01 |
| Actual value: | 64.39 | 2.95 | 20.67 | 10.49 |

(2) Synthesis of a compound represented by the above formula (3) wherein 0.85 of the rings A to D in the above formula (3) is a pyridine ring, the rest 3.15 are benzene rings, and n is 3.15.

To 46.2 parts of chlorosulfonic acid, 5.8 parts of the compound obtained in Example 2 (1) were gradually added at 60° C. or less, and then the reaction was carried out at 140° C. for 4 hours. Next, the reaction liquid was cooled to 70° C., 7.14 parts of thionyl chloride were added dropwise thereto over 30 minutes, and the reaction was carried out at 70° C. for 3 hours. The reaction liquid was cooled to 30° C. or less and slowly poured into 800 parts of ice water. The precipitated solid was separated by filtration and washed with 200 parts of cold water to obtain 40.0 parts of a wet cake of an intended compound.

(3) Synthesis of a coloring matter of the present invention represented by the above formula (16) [coloring matter of the above formula (1) wherein 0.85 of the rings A to D is a pyridine ring, the rest 3.15 are benzene rings, E is ethylene, X is 4-sulfoanilino, Y is 3-sulfoanilino, b is 2.31, and c is 0.84.]

To 50 parts of ice water, 40.0 parts of the wet cake of the compound obtained in Example 2 (2) were added, and the mixture was suspended at 5° C. or less. Ten minutes later, while the liquid temperature was maintained at 10° C. or less, 2 parts of 28% ammonia water and an aqueous solution dissolving 3.85 parts of a compound represented by the formula (15) in 30 parts of water were added to the suspension. While further adding 28% ammonia water thereto, said liquid was maintained at pH 9.0, the liquid temperature was raised to 20° C. over 1 hour, and the liquid was maintained at the same temperature for 8 hours. The liquid volume at this time was 240 parts. The temperature of the reaction liquid was raised to 50° C., 48 parts of sodium chloride (20% to the liquid) were added thereto, and the reaction liquid was stirred for 30 minutes. Subsequently, the liquid was adjusted to pH 3.0 over 20 minutes with concentrated hydrochloric acid, and then the precipitated solid was separated by filtration and washed with 100 parts of a 20% aqueous sodium chloride solution to obtain 51.0 parts of a wet cake. The obtained wet cake was added to 200 parts of water, and the mixture was adjusted to pH 9.0 using a 25% aqueous sodium hydroxide solution to dissolve the wet cake. The liquid volume at this time was 260 parts. The temperature of the solution was raised to 50° C., 26 parts of sodium chloride (10% to the liquid) were added thereto, and the reaction liquid was stirred for 30 minutes. Subsequently, the liquid was adjusted to pH 2.0 over 20 minutes with concentrated hydrochloric acid, and then the precipitated solid was separated by filtration and washed with 100 parts of 10% aqueous sodium chloride solution to obtain 48.2 parts of a wet cake. The obtained wet cake was added to a mixed liquid of 255 parts of methanol and 45 parts of water, the mixture was stirred at 50° C. for 1 hour, and then the solid was separated by filtration to obtain 33.5 parts of a wet cake. By drying the obtained wet cake, 11.2 parts of an intended coloring matter of the present invention were obtained as a blue powder.

λmax: 608.5 nm.

Example 4

(1) Synthesis of a compound represented by the above formula (6) wherein 0.65 of the rings A to D in the above formula (6) is a pyridine ring, and the rest 3.35 are benzene rings.

To a four-neck flask, 375 parts of sulfolane, 37.21 parts of phthalic anhydride, 9.41 parts of quinolinic acid, 108 parts of urea, 10.1 parts of copper (II) chloride and 1.5 parts of ammonium molybdate were added, the liquid temperature was raised to 200° C., and the liquid was maintained at the same temperature for 5 hours. After completion of the reaction, the reaction liquid was cooled to 65° C., 50 parts of DMF were added thereto, and the precipitated solid was separated by filtration. The resulting solid was washed with 50 parts of DMF to obtain 82.6 parts of a wet cake. The whole volume of the obtained wet cake was added to 450 parts of DMF, the liquid temperature was raised to 110° C., and the liquid was maintained at the same temperature for one hour. The solid was separated by filtration and washed with 200 parts of water. Subsequently, the obtained wet cake was added to 450 parts of 5% hydrochloric acid, the liquid temperature was raised to 60° C., and the liquid was maintained at the same temperature for 1 hour. The solid was separated by filtration and washed with 200 parts of water. The whole volume of the obtained wet cake was added to 450 parts of 5% ammonia water, and the mixture was maintained at 60° C. for 1 hour. The solid was separated by filtration and washed with 200 parts of water to obtain 82.6 parts of a wet cake. The obtained wet cake was dried at 80° C. to obtain 28.6 parts of an intended compound as a blue solid.

(2) Synthesis of a compound represented by the above formula (3) wherein 0.65 of the rings A to D in the above formula (3) is a pyridine ring, the rest 3.35 are benzene rings, and n is 3.35.

To 46.2 parts of chlorosulfonic acid, 5.8 parts of the compound obtained in Example 2 (1) were gradually added at 60° C. or less, and the reaction was carried out at 140° C. for 4 hours. Next, the reaction liquid was cooled to 70° C., 7.14 parts of thionyl chloride were added dropwise thereto over 30 minutes, and the reaction was carried out at 70° C. for 3 hours. The reaction liquid was cooled to 30° C. or less and slowly poured into 800 parts of ice water. The precipitated solid was separated by filtration and washed with 200 parts of cold water to obtain 43.2 parts of a wet cake of an intended compound.

(3) Synthesis of a coloring matter of the present invention represented by the above formula (16) [coloring matter of the above formula (1) wherein 0.65 of the rings A to D is a pyridine ring, the rest 3.35 are benzene rings, E is ethylene, X is 4-sulfoanilino, Y is 3-sulfoanilino, b is 2.49, and c is 0.86]

To 50 parts of ice water, 40.0 parts of the wet cake of the compound obtained in Example 2 (2) were added, and the mixture was suspended at 5° C. or less. Ten minutes later, while maintaining the liquid temperature at 10° C. or less, 2 parts of 28% ammonia water and an aqueous solution dissolving 4.81 parts of a compound represented by the formula (15) in 30 parts of water were added. While further adding 28% ammonia water thereto, said liquid was maintained at pH 9.0, the liquid temperature was raised to 20° C. over 1 hour, and the liquid was maintained at the same temperature for 8 hours. The liquid volume at this time was 250 parts. The temperature of the reaction liquid was raised to 50° C., 50 parts of sodium chloride (20% to the liquid) were added thereto, and the reaction liquid was stirred for 30 minutes. Subsequently, the liquid was adjusted to pH 3.0 over 20 minutes with concentrated hydrochloric acid and then the precipitated solid was separated by filtration and washed with 100 parts of a 20% aqueous sodium chloride solution to obtain 49.2 parts of a wet cake. The obtained wet cake was added to 200 parts of water, and the mixture was adjusted to pH 9.0 using a 25% aqueous sodium hydroxide solution to dissolve the wet cake. The liquid volume at this time was 260 parts. The temperature of the solution was raised to 50° C., 26 parts of sodium chloride (10% to the liquid) were added thereto, and the solution was stirred for 30 minutes. Subsequently, the solution was adjusted to pH 2.0 over 20 minutes with concentrated hydrochloric acid, and then the precipitated solid was separated by filtration and washed with 100 parts of a 10% aqueous sodium chloride solution to obtain 46.9 parts of a wet cake. The obtained wet cake was added to a mixed liquid of 255 parts of methanol and 45 parts of water, the mixture was stirred at 50° C. for 1 hour, and then the precipitated solid was separated by filtration to obtain 33.5 parts of a wet cake. By drying the obtained wet cake, 10.9 parts of an intended coloring matter of the present invention were obtained as a blue powder.

λmax: 612.0 nm.

Comparative Example 1

(1) Synthesis of a compound represented by the above formula (6) wherein 1.00 of the rings A to D in the above formula (6) is a pyridine ring, and the rest 3.00 are benzene rings.

To a four-neck flask, 375 parts of sulfolane, 33.29 parts of phthalic anhydride, 12.53 parts of quinolinic acid, 108 parts of urea, 10.1 parts of copper (II) chloride and 1.5 parts of ammonium molybdate were added, the liquid temperature was raised to 200° C., and the liquid was maintained at the same temperature for 5 hours. After completion of the reaction, the liquid was cooled to 65° C., 50 parts of DMF were added thereto, and the precipitated solid was separated by filtration. The resulting solid was washed with 50 parts of DMF to obtain 73.1 parts of a wet cake. The whole volume of the obtained wet cake was added to 450 parts of DMF, the liquid temperature was raised to 110° C., and the liquid was maintained at the same temperature for one hour. The solid was separated by filtration and washed with 200 parts of water. The obtained wet cake was added to 450 parts of 5% hydrochloric acid, the liquid temperature was raised to 60° C., and the liquid was maintained at the same temperature for 1 hour. The solid was separated by filtration and washed with 200 parts of water. The whole volume of the obtained wet cake was added to 450 parts of 5% ammonia water, and the mixture was maintained at 60° C. for 1 hour. The solid was separated by filtration and washed with 200 parts of water to obtain 78.1 parts of a wet cake. The obtained wet cake was dried at 80° C. to obtain 24.1 parts of an intended compound as a blue solid.

(2) Synthesis of a compound represented by the above formula (3) wherein 1.00 of the rings A to D in the above formula (3) is a pyridine ring, the rest 3.00 are benzene rings, and n is 3.

To 46.2 parts of chlorosulfonic acid, 5.8 parts of the compound obtained in Comparative Example 1 (1) were gradually added at 60° C. or less while stirring, and then the reaction was carried out at 140° C. for 4 hours. The resulting reaction liquid was cooled to 70° C., 7.14 parts of thionyl chloride were added dropwise over 30 minutes, and the reaction was carried out at 70° C. for 3 hours. The reaction liquid was cooled to 30° C. or less and the reaction liquid was slowly poured into 800 parts of ice water. The precipitated solid was separated by filtration and washed with 200 parts of cold water to obtain 42.4 parts of a wet cake of an intended compound.

(3) Synthesis of a coloring matter for comparison represented by the above formula (16) [coloring matter of the above formula (1) wherein 1.00 of the rings A to D is a pyridine ring, the rest 3.00 are benzene rings, E is ethylene, X is 4-sulfoanilino, Y is 3-sulfoanilino, b is 2.28, and c is 0.72]

To 50 parts of ice water, 42.4 parts of the wet cake obtained in Comparative Example 1 (2) were added, and the mixture was suspended at 5° C. or less. Ten minutes later, while maintaining the liquid temperature at 10° C. or less, 2 parts of 28% ammonia water and an aqueous solution dissolving 3.85 parts of a compound represented by the formula (15) in 30 parts of water were added to the suspension. While further adding 28% ammonia water thereto, said liquid was adjusted to pH 9.0, the liquid temperature was raised to 20° C. over 1 hour, and the liquid was maintained at the same temperature for 8 hours. The liquid volume at this time was 225 parts. The temperature of the reaction liquid was raised to 50° C., 45 parts of sodium chloride (20% to the liquid) were added thereto, the reaction liquid was stirred for 30 minutes, and then adjusted to pH 3.0 over 20 minutes with concentrated hydrochloric acid. The precipitated solid was separated by filtration and washed with 100 parts of a 20% aqueous sodium chloride solution to obtain 45.0 parts of a wet cake. The obtained wet cake was added to 200 parts of water, and the mixture was adjusted to pH 9.0 using a 25% aqueous sodium hydroxide solution to dissolve the wet cake. The liquid volume at this time was 260 parts. The temperature of the obtained solution was raised to 50° C., 26 parts of sodium chloride (10% to the liquid) were added thereto, and the mixture was stirred for 30 minutes and then adjusted to pH 2.0 over 20 minutes with concentrated hydrochloric acid. The precipitated solid was separated by filtration and washed with 100 parts of a 20% aqueous sodium chloride solution to obtain 44.2 parts of a wet cake. The obtained wet cake was added to a mixed liquid of 255 parts of methanol and 45 parts of water, the mixture was stirred at 50° C. for 1 hour, and then the solid was separated by filtration to obtain 31.9 parts of a wet cake. The obtained wet cake was dried to obtain 8.1 parts of a coloring matter for comparison as a blue powder.

λmax: 603.0 nm.

Comparative Example 2

(1) Synthesis of copper tetrabenzoporphyrazine tetra sulfonylchloride [compound of the above formula (3) wherein all of the rings A to D are benzene rings, and n is 4]

To 46.2 parts of chlorosulfonic acid, 5.8 parts of copper tetrabenzoporphyrazine were gradually added at 60° C. or less while stirring, and then the reaction was carried out at 140° C. for 4 hours. Next, the reaction liquid was cooled to 70° C., 7.14 parts of thionyl chloride were added dropwise over 30 minutes, and then the reaction was carried out 70° C. for 3 hours. The reaction liquid was cooled to 30° C. or less, and the reaction liquid was slowly poured into 800 parts of ice water. The precipitated solid was separated by filtration and washed with 200 parts of cold water to obtain 40.4 parts of a wet cake of an intended compound.

(2) Synthesis of a coloring matter for comparison represented by the above formula (16) [coloring matter of the above formula (1) wherein all of the rings A to D are benzene rings, E is ethylene, X is 4-sulfoanilino, Y is 3-sulfoanilino, b is 3.23, and c is 0.77]

To 50 parts of ice water, 40.4 parts of the wet cake of the compound obtained in Comparative Example 2 (1) were added, and the mixture was suspended at 5° C. or less. Ten minutes later, while maintaining the liquid temperature at 10° C. or less, 2 parts of 28% ammonia water and an aqueous solution dissolving 3.37 parts of a compound represented by the formula (15) in 30 parts of water were added to the suspension. While further adding 28% ammonia water thereto, said liquid was maintained at pH 9.0, the liquid temperature was raised to 20° C. over 1 hour, and the liquid was maintained at the same temperature for 8 hours. The liquid volume at this time was 225 parts. The temperature of the reaction liquid was raised to 50° C., 45 parts of sodium chloride (20% to the liquid) were added, and the reaction liquid was stirred for 30 minutes and then adjusted to pH 1.0 over 20 minutes with concentrated hydrochloric acid. The precipitated solid was separated by filtration and washed with 100 parts of a 20% aqueous sodium chloride solution to obtain 43.1 parts of a wet cake. The obtained wet cake was added to 200 parts of water, and the mixture was adjusted to pH 9.0 using a 25% aqueous sodium hydroxide solution to dissolve the wet cake. The liquid volume at this time was 260 parts. The temperature of the solution was raised to 50° C., 52 parts of sodium chloride (20% to the liquid) were added thereto, the mixture was stirred for 30 minutes and then adjusted to pH 1.0 over 20 minutes with concentrated hydrochloric acid. The precipitated solid was separated by filtration and washed with 100 parts of a 20% aqueous sodium chloride solution to obtain 45.2 parts of a wet cake. The obtained wet cake was added to a mixed liquid of 255 parts of methanol and 45 parts of water, and the mixture was stirred at 50° C. for 1 hour. The solid was separated by filtration to obtain 36.5 parts of a wet cake. The obtained wet cake was dried to obtain 10.1 parts of an intended coloring matter for comparison as a blue powder.

λmax: 609.0 nm.

(A) Preparation of Ink

The components described in the below-described Table 2 were dissolved by mixing, and the mixture was filtered using a 0.45 μm membrane filter (manufactured by Advantec Toyo Kaisha, Ltd.) to prepare an ink for evaluation tests. As "water" in preparation of the ink, ion-exchanged water was used. In addition, water and sodium hydroxide (pH adjuster) were added so that the pH of the ink was 8 to 10 and the total amount was 100 parts. The ink preparation using a coloring matter obtained in Example 1 is Example 5, and likewise the ink preparations using the coloring matters obtained Examples 2 and 3 are Examples 6 and 7, respectively. Inks for comparison ware prepared in the same manner as in Examples 5 to 7 except that the coloring matter for comparison obtained in Comparative Example 1 or 2 was used instead of the coloring matter obtained in Examples. These ink preparations are Comparative Examples 3 (where the coloring matter for comparison obtained in Comparative Example 1 was used) and 4 (where the coloring matter for comparison obtained in Comparative Example 2 was used), respectively.

TABLE 2

| | |
|---|---|
| Coloring matter obtained in each Example described above | 5.0 parts |
| Glycerine | 5.0 parts |
| Urea | 5.0 parts |
| N-methyl-2-pyrrolidone | 4.0 parts |
| Isopropylalcohol | 3.0 parts |
| Butyl carbitol | 2.0 parts |
| Taurine | 0.3 part |
| Ethylenediaminetetraacetic acid disodium | 0.1 part |
| Surfactant [manufactured by Nissin Chemical Industry Co., Ltd., trade name: Surfynol 104PG50] | 0.1 part |
| Water + aqueous sodium hydroxide solution | 75.5 parts |
| Total | 100.0 parts |

(B) Inkjet Recording

Using an inkjet printer (manufactured by Canon Inc., trade name: PIXUS® ip4100), inkjet recording was carried out on Advanced PhotoPaper manufactured by Hewlett-Packard Development Company as glossy paper.

For inkjet recording, an image pattern was made to obtain a density gradation of 6 steps, 100%, 85%, 70%, 55%, 40% and 25%, halftone recorded matters were obtained, and these were used as a test piece.

In addition, using a colorimetric system (SpectroEye, manufactured by GretagMacbeth), color measurement was carried out for reflection density. The color measurement was carried out under conditions of DIN as density criteria, a viewing angle of 2° and a light source of D 65.

The methods of testing recorded image and the methods of evaluating the test results will be described below.

(C) Evaluation of Recorded Image

1. Ozone Gas Fastness Test (A)

Using an ozone weatherometer (manufactured by Suga Test Instruments Co., Ltd.: Model OMS-H), each test piece was left under the circumstances of an ozone concentration of 10 ppm, a chamber temperature of 24° C. and a humidity of 60% RH for 24 hours. After the test, reflection density measurement was carried out on the part with a gradation step of 100%, the residual rate of coloring matter was determined from calculation using (reflection density after test/reflection density before test)×100(%) and evaluated on 3 levels. The reflection density of each test piece before the test was within the range of 2.17±0.05.

○: Residual rate is 80% or more.

Δ: Residual rate is less than 80% and 70% or more.

X: Residual rate is less than 70% and 60% or more.

The higher numerical value of residual rate of coloring matter is better. The results are shown in Table 3 below.

2. Ozone Gas Fastness Test (B)

Using an ozone weatherometer (manufactured by Suga Test Instruments Co., Ltd.: Model OMS-H), each test piece was left under the circumstances of an ozone concentration of 10 ppm, a chamber temperature of 24° C. and a humidity of 60% RH for 24 hours. After the test, reflection density measurement was carried out on the part with a gradation step of 70%, the residual rate of coloring matter was determined from calculation using (reflection density after test/reflection density before test)×100(%) and evaluated on 3 levels. The reflection density of each test piece before the test was within the range of 1.33±0.05.

○: Residual rate is 80% or more

Δ: Residual rate is less than 80% and 70% or more.

X: Residual rate is less than 70% and 60% or more.

The higher numerical value of residual rate of coloring matter is better. The results are shown in Table 3 below.

3. Ozone Gas Fastness Test (C)

Using an ozone weatherometer (manufactured by Suga Test Instruments Co., Ltd.: Model OMS-H), each test piece was left under the circumstances of an ozone concentration of 10 ppm, a chamber temperature of 24° C. and a humidity of 60% RH for 24 hours. After the test, reflection density measurement was carried out on the part with a gradation step of 40%, the residual rate of coloring matter was determined from calculation using (reflection density after test/reflection density before test)×100(%) and evaluated on 3 levels. The reflection density of each test piece before the test was within the range of 0.26±0.01.

○: Residual rate is 80% or more.

Δ: Residual rate is less than 80% and 70% or more.

X: Residual rate is less than 70%.

The higher numerical value of residual rate of coloring matter is better. The results are shown in Table 3 below.

4. Bronzing Evaluation

In bronzing evaluation, visual observation was carried out on 5 steps of the print density gradation, 100% density, 85% density, 70% density, 55% density and 40% density, to determine which is the gradation step where bronzing was caused, and evaluation was carried out. The test piece where no bronzing was caused is marked by OK, and the test piece bronzing was caused is marked by the lowest print density step where bronzing was caused. The obtained printed matter where bronzing is not caused is preferable.

5. Hue Evaluation (a)

In hue evaluation, using the above colorimetric system, color measurement was carried out on the 100% density part and evaluation was carried out to determine how close to the standard color the hue is. In this regard, using the solid patch color sample (3rd VERSION) of Japan Color published by Japan National Committee for ISO/TC 130 as the standard cyan color here, each hue was measured by the above colorimetric system. The results of the measurement with the standard color are shown below.

L*: 56.38, a*: −29.99, b*: −44.44

For the evaluation, L* a* and b* of each test piece were measured and each color difference (ΔE) from the standard color was determined. In this regard, each color difference (ΔE) was calculated using the following calculation formula.

$$\Delta E = (\Delta a^2 + \Delta b^2 + \Delta L^2)^{1/2}$$

From each calculated color difference, each hue was evaluated on 3 levels.

○: Color difference is 5 or more and less than 10.
Δ: Color difference is 10 or more and less than 15.
X: Color difference is 15 or more.

The results are shown in Table 4. As this value is smaller, the hue of test piece is closer to the standard color and preferable.

TABLE 3

Test result of ozone gas fastness

|  | (A) | (B) | (C) |
|---|---|---|---|
| Example 5 | Δ | Δ | Δ |
| Example 6 | Δ | Δ | ○ |
| Example 7 | Δ | Δ | ○ |
| Comparative Example 3 | ○ | Δ | ○ |
| Comparative Example 4 | X | X | Δ |

TABLE 4

Bronzing • hue evaluation result

|  | Bronzing | Hue (a) |
|---|---|---|
| Example 5 | OK | ○ |
| Example 6 | OK | Δ |
| Example 7 | OK | Δ |
| Comparative Example 3 | OK | X |
| Comparative Example 4 | OK | ○ |

As is clear from Tables 3 and 4, bronzing phenomenon was not observed on any of Examples and Comparative Examples, and all the Examples show good results in this respect. However, it is found that Comparative Example 3 has a good ozone gas fastness but its hue is the most different from the standard color and cannot be said to be sufficient as a cyan hue. In addition, it is confirmed that Comparative Example 4 is suitable as a cyan hue but its ozone gas fastness is insufficient.

On the contrary, it is clear that any of Examples is more excellent in balance of ozone gas fastness and hue than Comparative Examples.

INDUSTRIAL APPLICABILITY

As described above, it is clear that the porphyrazine coloring matter of the present invention and the ink composition containing this provide recorded matters having high ozone gas fastness together with a hue closer to the standard color and thus having a good balance, and they are extremely useful for various recordings, particularly for inkjet recording.

The invention claimed is:

1. A porphyrazine coloring matter represented by the following formula (1) or a salt thereof:

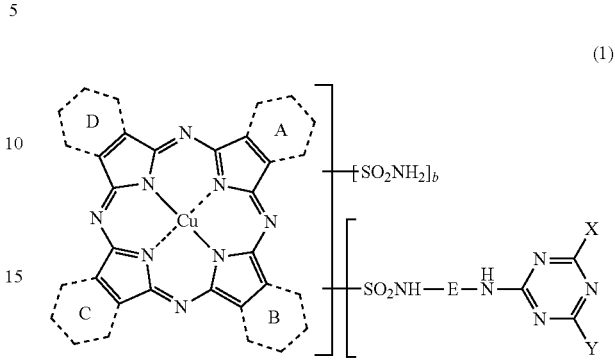

wherein, the rings A to D each independently represent a benzene ring or a 6-membered nitrogen-containing heteroaromatic ring fused to a porphyrazine ring, the number of the nitrogen-containing heteroaromatic ring is more than 0.00 and less than 1.00 as an average value, and the rest are benzene rings;

E represents alkylene;

X and Y are each independently an anilino or naphthylamino group having a sulfo group, a carboxy group or a phosphono group as a substituent;

in addition, said anilino or naphthylamino group may be substituted by 1 kind or 2 or more kinds of groups selected from the group consisting of a sulfo group, a carboxy group, a phosphono group, a sulfamoyl group, a carbamoyl group, a hydroxy group, an alkoxy group, an amino group, a mono- or dialkylamino group, a mono- or diarylamino group, an acetylamino group, an ureide group, an alkyl group, a nitro group, a cyano group, a halogen atom, an alkylsulfonyl group, an alkylthio group, an aryloxy group and a heterocyclic group;

b is 0.00 or more and less than 3.90 as an average value;

c is 0.10 or more and less than 4.00 as an average value;

and the sum of b and c is more than 3.00 and less than 4.00 as an average value, provided that the number of the nitrogen-containing heteroaromatic ring is more than 0.0 and less than 0.5 as an average value when X and Y are each independently an anilino group having 1 to 3 carboxy groups as a substituent, and b is 0 or more and up to 3.4 as an average value;

c is 0.1 or more and up to 3.5 as an average value;

and the sum of b and c is from 1.0 to 3.5.

2. The porphyrazine coloring matter or a salt thereof according to claim 1, wherein the 6-membered nitrogen-containing heteroaromatic rings represented by the rings A to D are pyridine rings or pyrazine rings.

3. The porphyrazine coloring matter or a salt thereof according to claim 1, which is obtained by reacting a porphyrazine compound represented by the following formula (3) with an organic amine represented by the following formula (4) in the presence of ammonia:

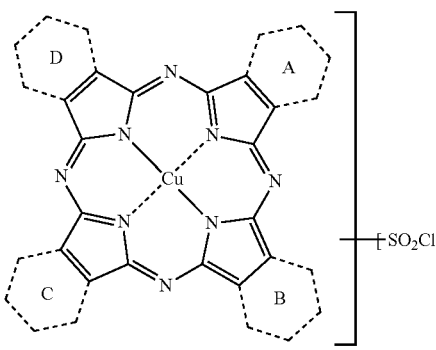

(3)

[wherein, the rings A to D have the same meaning as described in claim 1, and n is more than 3.00 and less than 4.00],

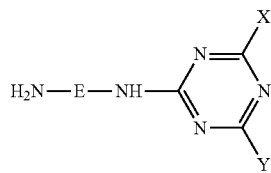

(4)

wherein, E, X and Y have the same meaning as described in claim 1.

4. The porphyrazine coloring matter or a salt thereof according to claim 1, wherein the 6-membered nitrogen-containing heteroaromatic ring for the rings A to D is a pyridine ring, and the ring-fusion position of said pyridine ring is the 2- and 3-positions, the 3- and 4-positions, the 4- and 5-positions or the 5- and 6-positions when the nitrogen atom of the pyridine ring is at the 1-position; or the 6-membered nitrogen-containing heteroaromatic ring for the rings A to D is a pyrazine ring, and the ring-fusion position of said pyrazine ring is the 2- and 3-positions when the nitrogen atom of the pyrazine ring is at the 1- and 4-positions;

E is C2-C4 alkylene;

X and Y are each independently an anilino or naphthylamino group having a sulfo group, a carboxy group or a phosphono group as a substituent;

said anilino or naphthylamino group may further have 0 to 3 substituents of 1 kind or 2 or more kinds selected from the group consisting of a hydroxy group, an alkoxy group, an ureide group, an acetylamino group, a nitro group and a chlorine atom.

5. The porphyrazine coloring matter or a salt thereof according to claim 1, wherein the number of the 6-membered nitrogen-containing heteroaromatic rings for the rings A to D is 0.2 to 0.9 as an average value and the rest are benzene rings;

b is 0.0 to 3.7 as an average value;

c is 0.1 to 3.8 as an average value;

and the sum of b and c is 3.1 to 3.8 as an average value.

6. The porphyrazine coloring matter or a salt thereof according to claim 1, wherein the number of the 6-membered nitrogen-containing heteroaromatic rings for the rings A to D is 0.25 to 0.85 as an average value, and the rest are benzene rings;

E represents C2-C4 alkylene;

X and Y are each independently an anilino group substituted by a sulfo group or a carboxy group;

b is 0.00 to 3.05 as an average value;

c is 0.10 to 3.75 as an average value;

and the sum of b and c is 3.15 to 3.75 as an average value.

7. The porphyrazine coloring matter or a salt thereof according to claim 1, wherein X and Y are each independently an anilino group substituted by a sulfo group.

8. The porphyrazine coloring matter or a salt thereof according to claim 1 or 7, wherein the 6-membered nitrogen-containing heteroaromatic ring for the rings A to D is a pyridine ring, and the ring-fusion position of said pyridine ring is the 2- and 3-positions when the nitrogen atom of the pyridine ring is at the 1-position, and the number of said pyridine ring is 0.50 to 0.85 as an average value, and the rest are benzene rings;

E is ethylene or propylene;

X and Y are each independently an anilino group having a sulfo group as a substituent;

b is 0.00 to 3.40 as an average value;

c is 0.10 to 3.50 as an average value;

and the sum of b and c is 3.15 to 3.50 as an average value.

9. An ink composition containing a porphyrazine coloring matter or a salt thereof according to any one of claims 1 and 5 as a coloring matter and further containing water.

10. The ink composition according to claim 9, which further contains an organic solvent.

11. The ink composition according to claim 9, which is for inkjet recording.

12. A method for inkjet recording, wherein recording is carried out by discharging an ink drop of an ink composition containing the porphyrazine coloring matter or a salt thereof according to claim 1 and water, in response to a recording signal to adhere on a record-receiving material.

13. The method for inkjet recording according to claim 12, wherein the record-receiving material is a communication sheet.

14. The method for inkjet recording according to claim 13, wherein the communication sheet is a sheet subjected to surface treatment and having an ink-receiving layer containing white inorganic pigment particles on the support.

15. A container containing an ink composition containing the porphyrazine coloring matter or a salt thereof according to claim 1, and water.

16. An inkjet printer comprising the container according to claim 15.

17. A colored product colored with an ink composition containing the porphyrazine coloring matter or a salt thereof according to claim 1, and water.

18. The porphyrazine coloring matter or a salt thereof according to any one of claims 1 and 6, wherein X and Y are each independently a 3-sulfoanilino group or a 4-sulfoanilino group.

19. An ink composition containing a porphyrazine coloring matter or a salt thereof according to claim 8 as a coloring matter and further containing water.

20. The ink composition according to claim 19, which further contains an organic solvent.

21. The ink composition according to claim 19, which is for inkjet recording.

22. The porphyrazine coloring matter or salt thereof according to claim 8, wherein X and Y are each independently a 3-sulfoanilino group or a 4-sulfoanilino group.

* * * * *